(12) United States Patent
Sarkis et al.

(10) Patent No.: US 12,192,920 B2
(45) Date of Patent: Jan. 7, 2025

(54) TECHNIQUES FOR AUTOMATIC GAIN CONTROL IN SIDELINK SYSTEMS

(71) Applicant: QUALCOMM Incorporated, San Diego, CA (US)

(72) Inventors: Gabi Sarkis, San Diego, CA (US); Kapil Gulati, Belle Mead, NJ (US); Shuanshuan Wu, San Diego, CA (US); Guangyi Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 420 days.

(21) Appl. No.: 17/671,325

(22) Filed: Feb. 14, 2022

(65) Prior Publication Data

US 2023/0262620 A1    Aug. 17, 2023

(51) Int. Cl.
*H04W 52/52* (2009.01)
*H04W 52/38* (2009.01)
*H04W 72/12* (2023.01)

(52) U.S. Cl.
CPC ......... *H04W 52/52* (2013.01); *H04W 52/383* (2013.01); *H04W 72/12* (2013.01)

(58) Field of Classification Search
CPC ... H04W 52/52; H04W 52/383; H04W 72/12; H04W 52/146
See application file for complete search history.

(56) References Cited

U.S. PATENT DOCUMENTS

| | | | | |
|---|---|---|---|---|
| 2020/0389246 A1* | 12/2020 | Wu | ........................ | H04L 5/0044 |
| 2021/0377893 A1* | 12/2021 | Khoryaev | ............. | H04L 5/0048 |
| 2022/0086830 A1* | 3/2022 | Zhang | ............... | H04W 72/0446 |
| 2023/0126206 A1* | 4/2023 | Elshafie | .............. | H04W 52/383 |
| | | | | 370/318 |
| 2023/0148141 A1* | 5/2023 | Hu | .................... | H04W 74/0808 |
| | | | | 370/329 |
| 2023/0232425 A1* | 7/2023 | Guo | ...................... | H04L 5/0023 |
| | | | | 370/330 |

OTHER PUBLICATIONS

Zhou, Xun, Rui Zhang, and Chin Keong Ho. "Wireless information and power transfer: Architecture design and rate-energy tradeoff." IEEE Transactions on communications 61.11 (2013): 4754-4767. (Year: 2013).*

Bazzi, Alessandro, et al. "On the design of sidelink for cellular V2X: A literature review and outlook for future." IEEE Access 9 (2021): 97953-97980. (Year: 2021).*

* cited by examiner

*Primary Examiner* — Sharad Rampuria
(74) *Attorney, Agent, or Firm* — Arun Swain

(57) ABSTRACT

Methods, systems, and devices for wireless communications are described. A scheduling device may indicate that a transmit power remains constant for a duration of time. A transmitting user equipment (UE) may transmit reference signals on dedicated resources for automatic gain control (AGC) training. As the transmit power from the transmitting UE may remain constant, a receiving UE may determine an AGC configuration for current and subsequent transmissions based on measurements made on the dedicated resources. By using a prior transmission to determine an AGC configuration for a current transmission, a training symbol may not be included in each slot. A symbol formerly used for AGC training in the current transmission may be used to carry sidelink information.

30 Claims, 16 Drawing Sheets

TECHNIQUES FOR AUTOMATIC GAIN CONTROL IN SIDELINK SYSTEMS

FIELD OF TECHNOLOGY

The following relates to wireless communications, including techniques for automatic gain control (AGC) in sidelink systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for automatic gain control (AGC) in sidelink systems. Generally, the described techniques provide for reducing AGC overhead in a wireless communications system. For example, a receiving user equipment (UE) may determine an AGC configuration for one or more slots or symbols based on a prior transmission, reusing an AGC configuration from a previous transmission to receive a current transmission. Some wireless communications systems support schemes where a scheduling device may schedule or grant resources for other devices, such as one UE granting resources to other UEs. The scheduling device may indicate for transmitting UEs to use a constant transmit power for each transmission over a duration of time, such as for a number of slots or for a number of transmissions. By configuring the transmitting UEs to use constant transmit powers for a duration of time, the receiving UE may be able to reuse AGC configurations at least within that duration. The transmitting UEs may be scheduled to transmit reference signals on dedicated resources for AGC training, and the receiving UE may determine an AGC configuration for subsequent slots and transmissions based on the measurements made on the dedicated resources. For example, the receiving UE may use a gain determined for a first UE from the dedicated resource to receive another transmission from the first UE in a subsequent slot, as the transmit power from the first UE may be the same.

In some cases, by using a prior transmission to determine an AGC configuration for a current transmission, an AGC training symbol in a slot of the current transmission may be used to carry information. For example, a symbol previously used for AGC training may be used to carry sidelink information (e.g., parity for an erasure code). In some examples, a sidelink shared channel resource in the slot may be rate matched to include the symbol, or a slot structure of the slot may be shifted such that the symbol formerly used for AGC becomes a first symbol in the sidelink transmission.

A method for wireless communications at a first UE is described. The method may include receiving, from a scheduling device, a transmit power indication configuring the first UE to use a same transmit power for sidelink signaling over a duration of time, transmitting, to a second UE and based on receiving the transmit power indication, a training sidelink transmission using a transmit power on a resource, and transmitting, to the second UE, one or more sidelink transmissions using the transmit power over the duration of time based on receiving the transmit power indication.

An apparatus for wireless communications at a first UE is described. The apparatus may include a processor, memory coupled with the processor, and instructions stored in the memory. The instructions may be executable by the processor to cause the apparatus to receive, from a scheduling device, a transmit power indication configuring the first UE to use a same transmit power for sidelink signaling over a duration of time, transmit, to a second UE and based on receiving the transmit power indication, a training sidelink transmission using a transmit power on a resource, and transmit, to the second UE, one or more sidelink transmissions using the transmit power over the duration of time based on receiving the transmit power indication.

Another apparatus for wireless communications at a first UE is described. The apparatus may include means for receiving, from a scheduling device, a transmit power indication configuring the first UE to use a same transmit power for sidelink signaling over a duration of time, means for transmitting, to a second UE and based on receiving the transmit power indication, a training sidelink transmission using a transmit power on a resource, and means for transmitting, to the second UE, one or more sidelink transmissions using the transmit power over the duration of time based on receiving the transmit power indication.

A non-transitory computer-readable medium storing code for wireless communications at a first UE is described. The code may include instructions executable by a processor to receive, from a scheduling device, a transmit power indication configuring the first UE to use a same transmit power for sidelink signaling over a duration of time, transmit, to a second UE and based on receiving the transmit power indication, a training sidelink transmission using a transmit power on a resource, and transmit, to the second UE, one or more sidelink transmissions using the transmit power over the duration of time based on receiving the transmit power indication.

A method for wireless communications at a second UE is described. The method may include receiving, from a scheduling device, a transmit power indication configuring one or more UEs to use a same transmit power for sidelink signaling over a duration of time, receiving, from a first UE of the one or more UEs, a training sidelink transmission transmitted at a transmit power on a resource, determining an AGC configuration based on receiving the training sidelink transmission, and receiving, from the first UE, one or more sidelink transmissions over the duration of time based on the AGC configuration.

An apparatus for wireless communications at a second UE is described. The apparatus may include a processor, memory coupled with the processor, and instructions stored in the memory. The instructions may be executable by the processor to cause the apparatus to receive, from a scheduling device, a transmit power indication configuring one or more UEs to use a same transmit power for sidelink signaling over a duration of time, receive, from a first UE of the one or more UEs, a training sidelink transmission transmitted at a transmit power on a resource, determine an AGC configuration based on receiving the training sidelink transmission, and receive, from the first UE, one or more sidelink transmissions over the duration of time based on the AGC configuration.

Another apparatus for wireless communications at a second UE is described. The apparatus may include means for receiving, from a scheduling device, a transmit power indication configuring one or more UEs to use a same transmit power for sidelink signaling over a duration of time, means for receiving, from a first UE of the one or more UEs, a training sidelink transmission transmitted at a transmit power on a resource, means for determining an AGC configuration based on receiving the training sidelink transmission, and means for receiving, from the first UE, one or more sidelink transmissions over the duration of time based on the AGC configuration.

A non-transitory computer-readable medium storing code for wireless communications at a second UE is described. The code may include instructions executable by a processor to receive, from a scheduling device, a transmit power indication configuring one or more UEs to use a same transmit power for sidelink signaling over a duration of time, receive, from a first UE of the one or more UEs, a training sidelink transmission transmitted at a transmit power on a resource, determine an AGC configuration based on receiving the training sidelink transmission, and receive, from the first UE, one or more sidelink transmissions over the duration of time based on the AGC configuration.

A method for wireless communications at a scheduling device is described. The method may include transmitting, to at least a first UE, an indication for the first UE to use a same transmit power for transmissions over a duration of time, where the same transmit power is a transmit power used by the first UE to transmit on a resource and transmitting a configuration to the first UE scheduling the first UE for one or more sidelink transmissions to a second UE using the transmit power on one or more slots.

An apparatus for wireless communications at a scheduling device is described. The apparatus may include a processor, memory coupled with the processor, and instructions stored in the memory. The instructions may be executable by the processor to cause the apparatus to transmit, to at least a first UE, an indication for the first UE to use a same transmit power for transmissions over a duration of time, where the same transmit power is a transmit power used by the first UE to transmit on a resource and transmit a configuration to the first UE scheduling the first UE for one or more sidelink transmissions to a second UE using the transmit power on one or more slots.

Another apparatus for wireless communications at a scheduling device is described. The apparatus may include means for transmitting, to at least a first UE, an indication for the first UE to use a same transmit power for transmissions over a duration of time, where the same transmit power is a transmit power used by the first UE to transmit on a resource and means for transmitting a configuration to the first UE scheduling the first UE for one or more sidelink transmissions to a second UE using the transmit power on one or more slots.

A non-transitory computer-readable medium storing code for wireless communications at a scheduling device is described. The code may include instructions executable by a processor to transmit, to at least a first UE, an indication for the first UE to use a same transmit power for transmissions over a duration of time, where the same transmit power is a transmit power used by the first UE to transmit on a resource and transmit a configuration to the first UE scheduling the first UE for one or more sidelink transmissions to a second UE using the transmit power on one or more slots.

DETAILED DESCRIPTION

Figure 1:
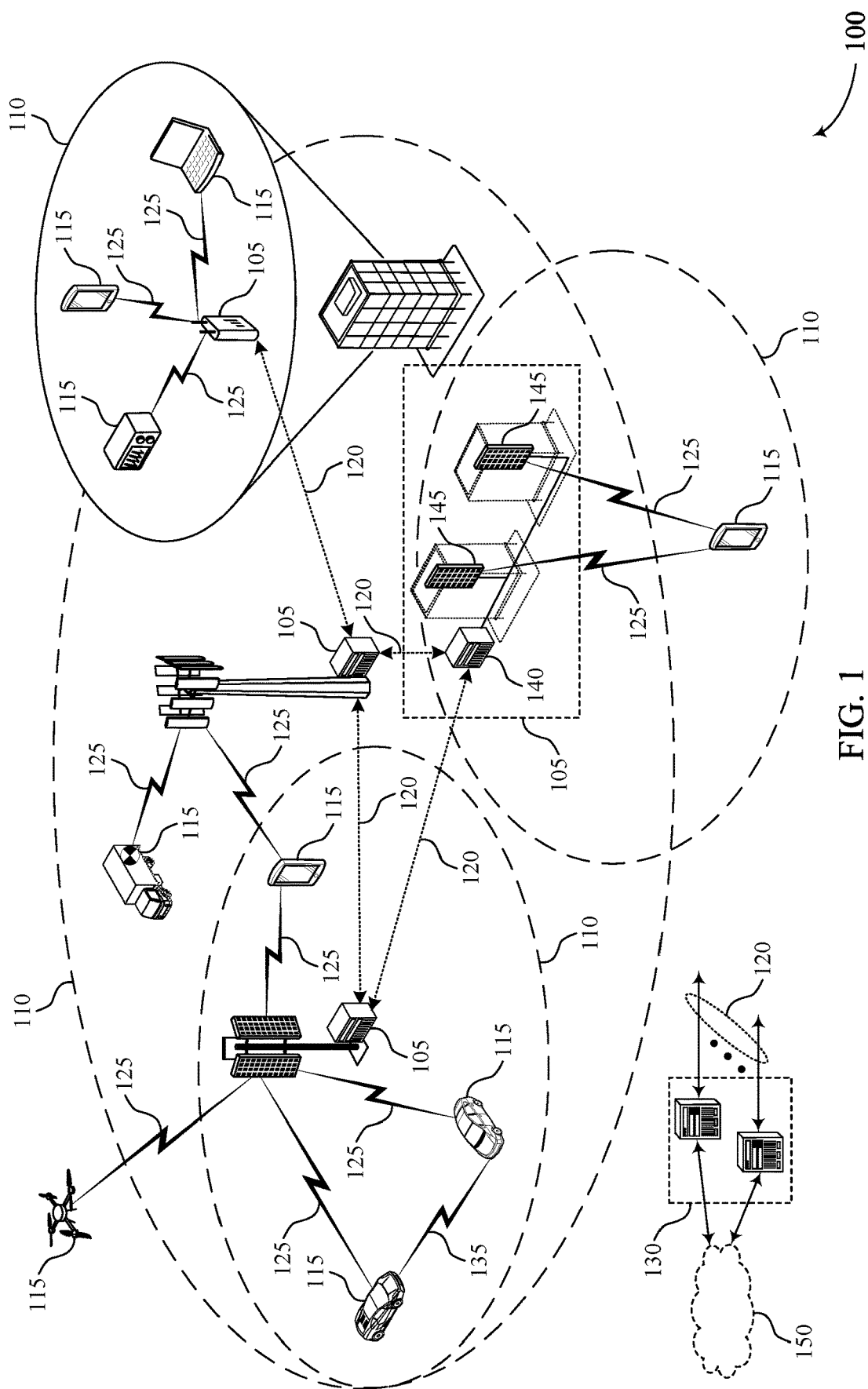
FIG. 1 illustrates an example of a wireless communications system that supports techniques for automatic gain control (AGC) in sidelink systems in accordance with aspects of the present disclosure.

In some wireless communications system supporting sidelink communications, a scheduling device may schedule sidelink communications between a transmitting user equipment (UE) and a receiving UE. In some cases, the receiving UE may perform automatic gain control (AGC) to compensate for variations in received power. For example, a received power of a sidelink transmission may be variable due to a number of transmitting UEs being variable, scheduling for the UEs being variable, and a distance from the transmitting UE to the receiving UE being variable, among other factors. To compensate for the variability of the transmit power, the receiving UE may perform AGC to regulate a received signal strength. Some systems may dedicate a first symbol of each slot as a training symbol to train an AGC configuration at the receiving UE. For example, a first symbol of each slot may be repeated to accommodate an AGC settling time. However, this first symbol may not be decodable and is therefore not used to transmit new information, as the UE may still be training the AGC configuration during the first symbol. Repeating a training symbol for every slot may cause inefficient AGC overhead and reduce throughput.

The techniques described herein provide techniques for reducing AGC overhead in sidelink systems. For example, a receiving UE may determine an AGC configuration to receive a current transmission based on previously received transmissions. For example, a scheduling device may indicate that a transmit power for each transmission is to remain constant for a duration or for a number of transmissions. One or more transmitting UEs may transmit reference signals on dedicated resources for AGC training. In some cases, the one or more transmitting UEs may be preconfigured to transmit the reference signals on the dedicated resources, or the scheduling device may configure or schedule the one or more transmitting UEs to transmit the reference signals on the dedicated resources. A receiving UE may determine an AGC configuration for current and subsequent slots and transmissions based on measurements made on the dedicated resources. For example, the receiving UE may use an AGC configuration determined for a first UE from the dedicated resource to receive another transmission from the first UE in a subsequent slot, as the transmit power from the first UE may be the same. In some examples, the scheduling device may transmit the indication to one or more transmitting UEs, the receiving UE, or both. In some cases, by using a prior transmission to determine an AGC configuration for a current transmission, an AGC training symbol may not be included in each slot. Therefore, a symbol formerly used for AGC training in the current transmission may be used to carry sidelink information (e.g., parity for an erasure code). In some examples, a sidelink shared channel resource in the slot may be rate matched to include the symbol, or a slot structure of the slot may be shifted such that the symbol formerly used for AGC becomes a first symbol in the sidelink transmission.

Aspects of the disclosure are initially described in the context of wireless communications systems. Aspects of the disclosure are then described in the context of a subsystem diagram and a process flow diagram. Aspects of the disclosure are further illustrated by and described with reference to apparatus diagrams, system diagrams, and flowcharts that relate to techniques for AGC in sidelink systems.

FIG. 1 illustrates an example of a wireless communications system 100 that supports techniques for AGC in sidelink systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications systems 100 may support sidelink communications. Some systems supporting sidelink communications may implement different modes for allocating resources for sidelink communications. For example, for a first mode, a base station 105 may schedule or grant resources to UEs 115. For a second mode, UEs 115 may autonomously select resources for sidelink communications. In some cases, the wireless communications system 100 may support techniques where a scheduling device, such as a UE 115 or a roadside unit (RSU) 160, schedules or grants resources for sidelink communications between UEs 115. For example, similar to the role of a base station 105 in the first mode, a UE 115 may schedule or grant resources to other UEs 115. The resources may be determined locally by scheduling UEs 115 or based on input from a base station 105.

The wireless communications system 100 may support techniques for AGC. In some systems, a first symbol of a slot may be repeated to accommodate an AGC settling time at the receiver. For example, the first symbol of a sidelink transmission may be repeated on a preceding symbol of the sidelink transmission. However, this first symbol may not be decodable and is therefore not used to transmit new information, as a UE 115 may still be training the AGC configuration to determine a gain to receive the sidelink transmission during the first symbol. Repeating a training symbol for every slot may cause inefficient AGC overhead and reduce throughput.

Techniques described herein provide for reducing AGC overhead when transmissions are scheduled. For example, a receiving UE 115 may derive an AGC setting (e.g., configuration) for a current transmission from a prior transmission. In some cases, the receiving UE 115 may reuse the AGC settings determined from a previous transmission for a duration where transmit power, or transmission power, is configured to remain constant. For example, a scheduling device (e.g., a UE 115, a base station 105, an RSU 160) may indicate that a transmit power for each transmission is to remain constant for a duration of time, such as for a number of slots or for a number of transmissions. Transmitting UEs 115 may transmit reference signals on dedicated resources for AGC training, and a receiving UE 115 may determine an AGC configuration for subsequent slots and transmissions based on measurements made on the dedicated resources. For example, the receiving UE 115 may use an AGC configuration determined for a first UE 115 from the dedicated resource to receive another transmission from the first UE 115 in a subsequent slot, as the transmit power from the first UE 115 may be the same. In some examples, the scheduling device may transmit the indication to one or more transmitting UEs 115, the receiving UE 115, or both.

In some cases, by using a prior transmission to determine an AGC configuration for a current transmission, a training symbol may not be included in each slot. Therefore, a symbol formerly used for AGC training in the current transmission may be used to carry sidelink information (e.g., parity for an erasure code). In some examples, a physical sidelink shared channel (PSSCH) resource in the slot may be rate matched to include the symbol, or a slot structure of the slot may be shifted such that the symbol formerly used for AGC becomes a first symbol in the sidelink transmission.

Figure 2:
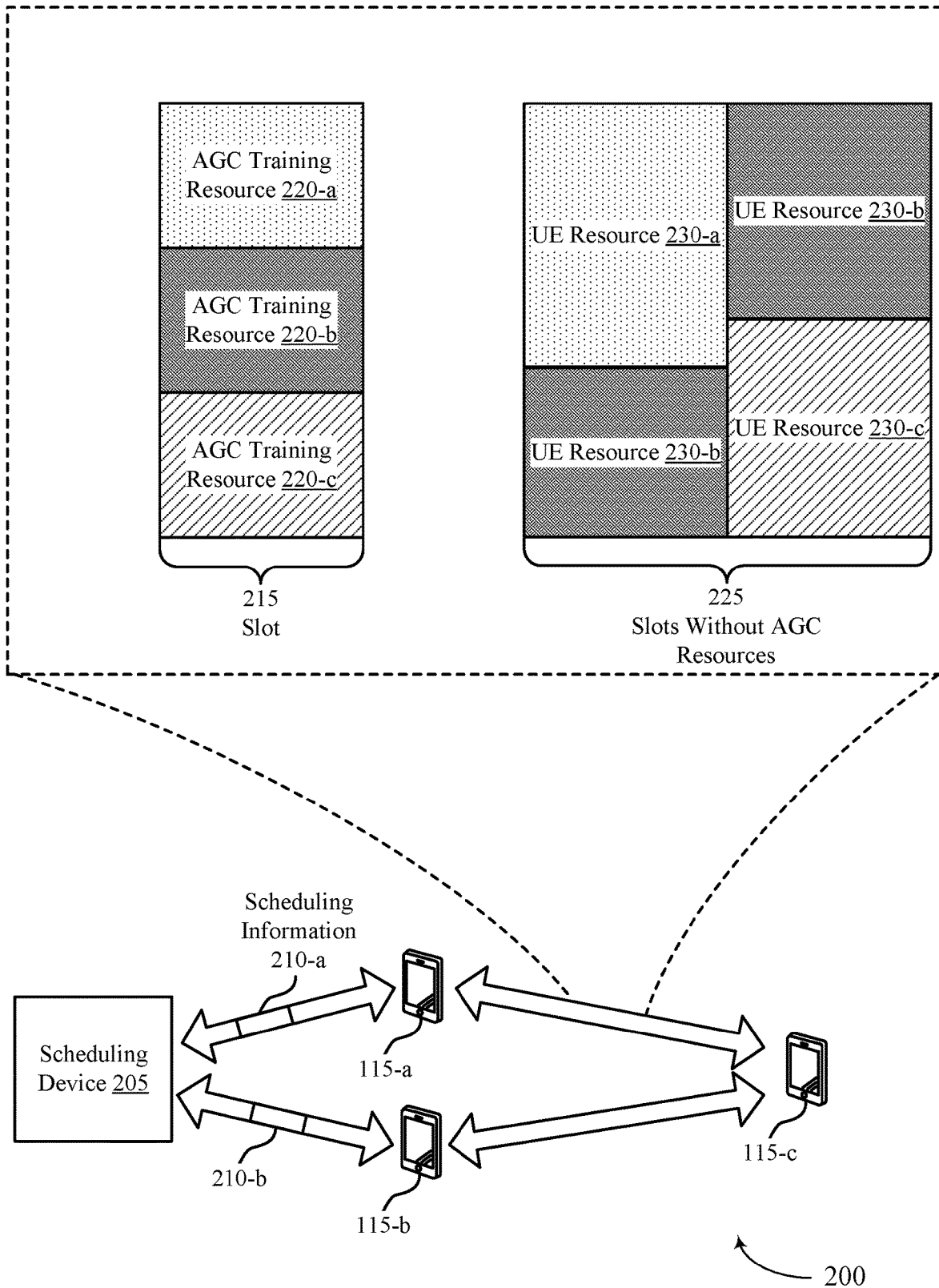
FIG. 2 illustrates an example of a wireless communications system that supports techniques for AGC in sidelink systems in accordance with aspects of the present disclosure.

FIG. 2 illustrates an example of a wireless communications system 200 that supports techniques for AGC overhead in sidelink systems in accordance with aspects of the present disclosure. In some examples, the wireless communications system 200 may implement aspects of the wireless communications system 100. The wireless communications system 200 may include a UE 115-a, a UE 115-b, and a UE 115-c in sidelink communication, which may each be an example of a UE 115 as described herein with reference to FIG. 1. In some cases, the UE 115-a and the UE 115-b may each be an example of a transmitting UE 115, and the UE 115-c may be an example of a receiving UE 115. A scheduling device 205 may communicate with the UE 115-a, the UE 115-b, the UE 115-c, or any combination thereof. In some cases, the scheduling device 205 may be an example of a UE 115, a base station 105, or an RSU 160 as described herein with reference to FIG. 1.

The wireless communications system 200 may support a resource allocation mode for sidelink communications where a scheduling device 205 schedules or grants resources for sidelink communications between UEs 115. For example, the scheduling device 205 may schedule one or more transmitting UEs 115 (e.g., UE 115-a, UE 115-b) to transmit sidelink messages to one or more receiving UEs 115 (e.g., UE 115-c).

In some cases, a receiving UE 115 may perform AGC to compensate for variations in received power. For example, a received power of a sidelink transmission may be variable due to a number of transmitting UEs 115 being variable, scheduling for the transmitting UEs 115 and the receiving UE 115 being variable, and a distance from the transmitting UE 115 to the receiving UE 115 being variable, among other factors. To compensate for the variability of the transmit power, the receiving UE 115 may perform AGC to regulate a received signal strength.

Some wireless communications systems may use a training symbol to train an AGC configuration at the receiving UE 115. For example, a first symbol of each slot may be repeated to accommodate an AGC settling time. However, this first symbol may not be decodable and is therefore not used to transmit new information, as the receiving UE 115 may still be training the AGC configuration during the first symbol. Repeating a training symbol for every slot may cause inefficient AGC overhead and reduce throughput.

The wireless communications system 200 may implement techniques to reduce AGC overhead. Generally, these techniques enable a UE 115 to reuse an AGC configuration determined from previously-received signaling to quickly and efficiently determine a gain for future communications. For example, a receiving UE 115 may derive AGC settings, such as for one or more upcoming slots or upcoming symbols in a slot, based on scheduled transmissions and measurements of an initial received power. The scheduling device 205 may indicate that transmit power for each transmission will remain constant for a duration of time or for a number of scheduled transmissions. Due to the constant transmit power, the receiving UE 115 may reuse the AGC settings determined from the training signaling to receive future sidelink signaling.

A transmitting UE 115 may be configured with an AGC training resource 220 and transmit training signaling on the AGC training resource 220 to a receiving UE 115. The receiving UE 115 may determine AGC settings for the transmitting UE 115 based on the signaling received on the AGC training resources 220. For example, the UE 115-a may be configured with an AGC training resource 220-a, and the UE 115-a may transmit reference signals on the AGC training resource 220-a to the UE 115-c. The UE 115-c may identify AGC settings or an AGC configuration for the UE 115-a based on performing AGC training on the AGC training resource 220-a. If the transmit power from the UE 115-a is constant, the UE 115-c may determine an AGC configuration for current and subsequent transmissions based on measurements made on the initial received power of the reference signals transmitted on the AGC training resource 220-a. For example, the UE 115-a may be scheduled to transmit a sidelink data message to the UE 115-c on a resource 230-a. To receive the sidelink data message on the resource 230-a, the UE 115-c may use a gain or AGC configuration which is determined based on the signaling received on the AGC training resource 220-a. Therefore, the signaling on the resource 230-a does not need to include a dedicated symbol for AGC training, as the UE 115-c may reuse the AGC configuration from previously-received signaling.

In some cases, to facilitate reusing an AGC configuration, the scheduling device 205 may indicate for the transmitting UEs 115 to use a constant transmit power for a duration of time. The scheduling device 205 may transmit the indication to use a constant transmit power to one or more transmitting UEs 115, one or more receiving UEs 115, or any combination thereof. The scheduling device 205 may indicate for the transmitting UEs 115 to use a constant transmit power for a specific duration of time (e.g., a certain number of symbols, slots, frames, microseconds, etc.) or for a number of transmissions (e.g., use a same transmit power for the next five scheduled transmissions). In some examples, the transmitting UEs 115 may configure their respective transmit powers to remain constant over the duration of time. In some cases, the indication to use a constant transmit power may be transmitted as downlink control information (DCI), a sidelink control indicator (SCI), a MAC control element (CE), RRC, sidelink RRC, PC5-RRC, or any combination thereof.

In some cases, the scheduling information 210-a may include the indication for the transmitting UEs 115 to use a constant transmit power. For example, the indication may be included with, or indicated by, the scheduling information 210. Additionally, or alternatively, the scheduling device 205 may transmit separate signaling to indicate for the transmitting UEs 115 to use a constant transmit power.

In some cases, the scheduling device 205 may explicitly indicate a duration (e.g., time or slots), a number of transmissions, or both, that the transmit power for the one or more transmitting UEs 115 is to remain constant. For example, the scheduling device 205 may indicate that during the next ten slots, or during the next ten milliseconds, or during the next five transmissions, a transmit power for one or more transmitting UEs 115 is to remain constant (e.g., within an acceptable range). In some cases, if there are multiple transmitting UEs 115, the scheduling device 205 may indicate a duration of time during which each of the transmitting UEs 115 is to use a constant transmit power. For example, the duration of time or the number of transmissions may be common to each of the transmitting UEs 115 or at least a group of the transmitting UEs 115. Additionally, or alternatively, the scheduling device 205 may indicate different durations of times (e.g., or numbers of transmissions) for different transmitting UEs 115. In some cases, the number of transmissions may correspond to a number of transmissions from a single UE 115, a number of total transmissions from multiple different UEs 115, a number of different transport blocks (TBs) from a same UE 115, or a number of total different TBs from different UEs 115.

Additionally, or alternatively, the scheduling device 205 may indicate to the one or more transmitting UEs to use a certain transmit power level or to maintain a constant transmit power for a duration of time. For example, the scheduling device 205 may configure the UE 115-a to use a specific transmission level (e.g., a certain number of decibels per milliwatt or a value for a transmit power) for the duration of time. In some other examples, the scheduling device 205 may configure the UE 115-a to continue using or maintain a same transmit power (e.g., maintain a same transmit power as used for an AGC training resource or a previous transmission) for the indicated duration of time. For example, the UE 115-a may use a same transmit power to transmit on other resources within the duration of time (e.g., on the resource 230-b) as used to transmit on the AGC training resource 220-a, or the UE 115-a may use approximately the same transmit power (e.g., within a threshold or an acceptable range, which may be configured).

In some cases, the scheduling device 205 may indicate which UEs 115 transmit and in which slots. For example, the scheduling device 205 may transmit the scheduling information 210-a and scheduling information 210-b to the UE 115-a and a UE 115-b, respectively, scheduling the UEs 115 for resources during the slot 215 or the slots 225, or both. For example, the scheduling device 205 may transmit the scheduling information 210-a to schedule the UE 115-a to transmit on the AGC training resource 220-a and the resource 230-a during one or more of the slots 225 without AGC resources. In some cases, the scheduling device 205 may transmit scheduling information 210-b to schedule the UE 115-b to transmit on the AGC training resource 220-b and the resources 230-b during one or more of the slots 225 without AGC resources.

In some examples, the scheduling device 205 may transmit the indication of the duration of constant transmit power, the indication of the transmit power level, or the indication to transmit on specific slots, or any combination thereof, as a single sidelink message. For example, the scheduling device 205 may transmit these indications separately or transmit multiple indications together in the same message. For example, the scheduling device may indicate scheduling information, transmit power information (e.g., a transmit power level and to use a constant transmit power), and a duration to use the constant transmit power in a message carrying the scheduling information 210. These indications may be transmitted via DCI, SCI, a MAC CE, a PC5-MAC CE, RRC signaling, sidelink RRC signaling, PC5-RRC signaling, or any combination thereof.

The AGC training resources 220 may be examples of dedicated resources for AGC training. For example, the AGC training resource 220-a, the AGC training resource 220-b, and a AGC training resource 220-c may each be an example of an AGC resource. Additionally, or alternatively, an AGC resource may refer to all of the AGC training resources 220. In some cases, the AGC resources may be preconfigured within the wireless communications system 200. Additionally, or alternatively, the scheduling device 205 may configure or allocate the AGC training resources 220 and indicate the AGC training resources 220 to the UEs 115. For example, the AGC resources may be configured via RRC signaling, sidelink RRC signaling, PC5-RRC signaling, a MAC CE, a PC5-MAC CE, DCI, SCI, or any combination thereof. For example, a UE 115-a may be configured with the AGC training resource 220-a.

In some cases, the AGC training resources 220 may be in a same slot. For example, the AGC training resources 220 for multiple different transmitting UEs 115 may be allocated in a same slot, such as the slot 215, where the AGC training resource 220-a and the AGC training resource 220-b are frequency division multiplexed together. For example, different UEs 115 may be allocated different subchannels of a slot for the AGC training resources 220. Additionally, or alternatively, the AGC training resources 220 for different transmitting UEs 115 may be time division multiplexed. For example, AGC training resources 220 for different UEs 115 may be scheduled in different symbol periods of a slot. In some cases, each symbol of the slot 215 may include resources dedicated for AGC training from different transmitting UEs 115. For example, the slot 215 may include dedicated AGC resources which are time division multiplexed for up to fourteen different UEs 115.

The AGC resources may be associated with future resources, such that a receiving UE 115 can reuse an AGC configuration from the AGC training resources 220 when receiving signaling on the future resources. For example, one or more later slots, symbols, or frames may be associated with the AGC resources. In some cases, the associated resources, such as the slots 225, may not include dedicated AGC resources (e.g., one symbol per slot), as the UE 115-c may reuse the AGC configuration from the AGC resources in the slot 215. This may provide additional resources which can be used to send information. For example, where other systems may dedicate a first symbol of each slot to AGC training, the resources 230 in the slots 225 without AGC resources may not dedicate the first symbol to AGC training.

For example, the resources 230 may be examples of future resources which are associated with the AGC training resources 220. When receiving signaling on the resources 230 from a transmitting UE 115, the UE 115-c may use an AGC configuration for that transmitting UE 115 which was determined from an associated AGC training resource 220. For example, the UE 115-c may determine an AGC configuration for the UE 115-a based on performing measurements on the AGC training resource 220-a, and the UE 115-c may use that AGC configuration to receive signaling from the UE 115-a on the resource 230-a.

In some examples, the association may be broadcast by the scheduling device 205. For example, the scheduling device 205 may broadcast a mapping, or an association map, between the AGC training resources 220 and future, associated resources, such as the resources 230. In some cases, the scheduling device 205 may broadcast an indication of which resources (e.g., which slots) are associated with an AGC training resource 220, and which resources (e.g., which slots) are not associated with an AGC training resource 220. For example, the scheduling device 205 may indicate that a next five slots are associated with the AGC resources in the slot 215.

Additionally, or alternatively, the association between AGC resources and other resources may be indicated as part of the scheduling transmission. For example, the scheduling device 205 may indicate which resources are associated with the AGC resources via scheduling information 210. For example, the scheduling information 210 may indicate to the UE 115-a that the slots 225, or which resources 230 in the slots 225, are associated with the AGC training resources 220 in the slot 215. The mappings or associations may be indicated via an index, a slot index, a symbol index, or any combination thereof. In some cases, some resources, such as some slots, may not be associated with any AGC resource and may be indicated as such. Selective association with an AGC resource may be efficient for urgent or irregular signaling.

Through this association, the UE 115-c may use an AGC configuration determined for the one or more transmitting UEs to receive another transmission from the one or more transmitting UEs in a subsequent slot. For example, the UE 115-c may receive training signals from one or more UEs 115 during AGC training resources 220 in the slot 215. The UE 115-c may determine one or more AGC configurations based on initial measurements and AGC training procedures on the AGC training resources 220. The UE 115-c may identify that the resources 230 are mapped to the AGC resources (e.g., the AGC training resources 220) and receive signaling on the resources 230 based on the AGC configuration determined for the AGC training resources 220. For example, the UE 115-c may receive signaling from the UE 115-a on the resources 230-a, and the UE 115-c may apply a gain which is determined based on signaling received from the UE 115-a on the AGC training resources 220-a. The UE 115-a may use a same transmit power to transmit on both the AGC training resource 220-a and the resource 230-a, so the gain determined for the AGC training resource 220-a may be usable for the resource 230-a.

In some cases, the UE 115-c may determine the gain for a resource 230 based on AGC settings for multiple AGC resources. For example, the UE 115-c may determine the gain for the resource 230-a based on AGC settings for the AGC training resource 220-a and the AGC training resource 220-b. In some cases, the UE 115-c may determine the gain based on AGC settings from multiple AGC resources if, for example, multiple UEs 115 are transmitting at a same time. For example, the resource 230-a may be frequency division multiplexed with the resource 230-b, or the resources 230 may at least partially overlap in time. Therefore, the UE 115-c may determine a gain to receive the resource 230-a or the resource 230-b, or both, based on an AGC configuration derived based on at least the AGC training resource 220-a or the AGC training resource 220-b, or both.

In some examples, the resources 230 associated with, or mapped to, the AGC training resource 220 according to these techniques may not include an AGC training symbol. For example, the resources 230 may not dedicate a symbol period to AGC training, and a symbol period (e.g., a first symbol period of the slot) which is used for AGC training in other systems may be used to carry information. In some cases, the symbol period of a slot which is used for AGC training in other systems, but is used to convey information by applying techniques described herein, may be referred to as a former AGC training symbol.

In some cases, the former AGC training symbol may be used to convey sidelink information. For example, the symbol period may be used to add parity for an erasure code. In some cases, the former AGC symbol may be used to carry information by rate-matching the PSSCH resources in a slot to include the former AGC symbol. In some cases, a slot structure of a slot may be shifted such that the former AGC symbol becomes the first symbol in the sidelink transmission. For example, a beginning information symbol of the sidelink information may start at a second symbol past the former AGC symbol (as in a slot structure containing the AGC symbol) of the slot, where each subsequent information symbol of the sidelink information may fill in each subsequent symbol of the slot, until the last symbol of the slot. Then, the former AGC symbol is filled with a subsequent information symbol of the sidelink information of the information symbol that filled the last symbol of the slot. Additionally, or alternatively, the beginning information symbol of the sidelink information may start at the former AGC symbol, such that the slot structure is shifted by one symbol. Thus, the former AGC training symbol may be used for more sidelink information, which may increase throughput and reduce AGC overhead.

Figure 3:
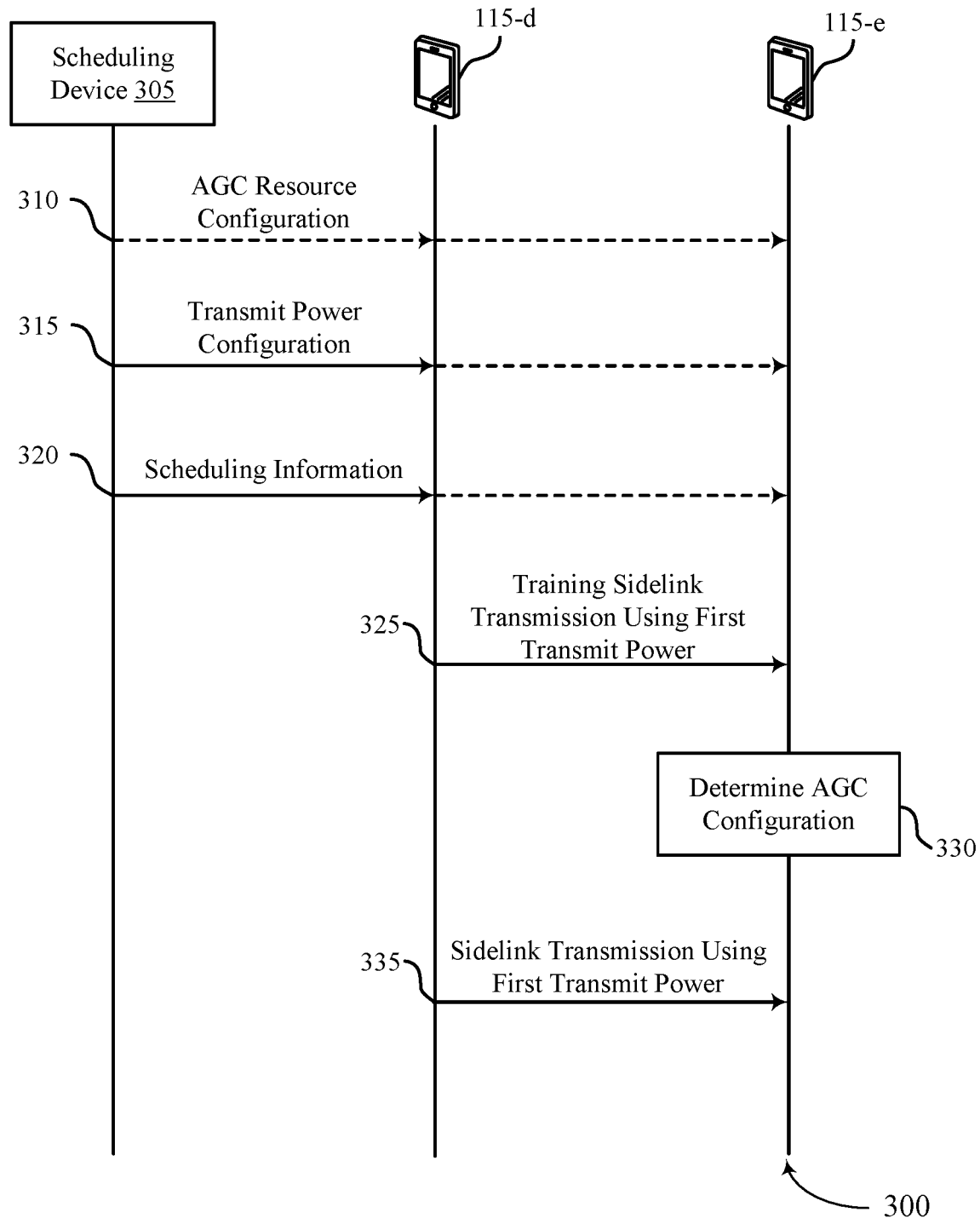
FIG. 3 illustrates an example of a process flow that supports techniques for AGC in sidelink systems in accordance with aspects of the present disclosure.

FIG. 3 illustrates an example of a process flow 300 that supports techniques for AGC overhead in sidelink systems in accordance with aspects of the present disclosure. The process flow 300 may include a UE 115-*d*, a UE 115-*e*, and a scheduling device 305, which may be respective examples of UEs 115 and a scheduling device 205 as described with reference to FIGS. 1 and 2. In some cases, the UE 115-*d* may be an example of a transmitting UE 115 and the UE 115-*e* may be an example of a receiving UE 115. In some cases, the scheduling device 305 may be an example of a UE 115, a base station 105, or an RSU.

In some cases, at 310, scheduling device 305 may transmit, to the UE 115-*d* or the UE 115-*e*, or both, an indication of a resource. In some examples, the resource may be configured for AGC training. For example, the scheduling device 305 may configure, allocate, or indicate, an AGC training resource to the UE 115-*d* or the UE 115-*e*, or both. The indication of the resource configured for AGC training may be transmitted via RRC signaling, sidelink RRC signaling, PC5-RRC signaling, DCI, SCI, a MAC CE, or any combination thereof. In some cases, the indication may be transmitted via a sidelink (e.g., if the scheduling device 305 is an example of a UE 115) or transmitted on a downlink (e.g., if the scheduling device 305 is an example of a base station 105).

At 315, the scheduling device 305 may transmit an indication of a transmit power configuration to one or more UEs 115. For example, the scheduling device 305 may transmit, to at least a first transmitting UE 115, an indication for the transmitting UEs 115 to use a same transmit power for transmissions over a duration of time. For example, the scheduling device 305 may transmit the indication to one or more transmitting UEs 115 including at least the UE 115-*d*. The scheduling device 305 may indicate for the UE 115-*d* to use a same transmit power used by the UE 115-*d* to transmit on the resource configured for AGC training. In some cases, the transmit power indication may be transmitted via RRC signaling, sidelink RRC signaling, PC5-RRC signaling, DCI, SCI, MAC-CE, or any combination thereof. In some cases, the resource configured for AGC training may be an example of an AGC training resource 220-*a* as described with reference to FIG. 2.

The UE 115-*d* may receive, from the scheduling device 305, the transmit power indication configuring the UE 115-*d* to use a same transmit power for sidelink signaling over a duration of time. Similarly, the UE 115-*e* may receive, from the scheduling device 305, the transmit power indication configuring the one or more transmitting UEs 115 (e.g., including the UE 115-*d*) to use a same transmit power for sidelink signaling over the duration of time.

At 320, the scheduling device 305 may transmit a configuration to the UE 115-*d* scheduling the UE 115-*d* for one or more sidelink transmissions to the UE 115-*e* using the transmit power on one or more slots. For example, the scheduling device 305 may transmit scheduling information to the UE 115-*d*, scheduling the UE 115-*d* to transmit to the UE 115-*e*. In some cases, the scheduling device 305 may schedule the UE 115-*d* to transmit training signaling to the UE 115-*e* on AGC training resources. Additionally, or alternatively, the scheduling device 305 may schedule the UE 115-*d* for a sidelink data transmission to the UE 115-*e*.

In some cases, the transmit power indication may be included with scheduling information. For example, the transmit power configuration at 315 and the configuration at 320 may be transmitted in a same message or may be transmitted in a same signaling. For example, the scheduling device 305 may transmit scheduling information to the UE 115-*d* or the UE 115-*e*, or both, and the scheduling information may indicate for the UE 115-*d* to use a same transmit power for a duration of time, or the scheduling information may indicate for the UE 115-*d* to use a same transmit power as used to transmit on an AGC training resource, or both.

At 325, the UE 115-*d* may transmit, to the UE 115-*e* and based on receiving the transmit power indication, a training sidelink transmission using a transmit power on a resource configured for AGC training. For example, the UE 115-*d* may transmit sidelink signaling including reference signals to the UE 115-*e* on AGC training resources. The UE 115-*e* may receive, from the UE 115-*d*, a the training sidelink transmission on the resource configured for AGC training.

In some cases, there may be multiple transmitting UEs 115. For example, the UE 115-*e* may be scheduled to receive AGC training signaling from multiple transmitting UEs 115 on respective AGC training resources. The AGC training resources for the UEs 115 may be multiplexed together, such as being frequency division multiplexed during a same symbol period or slot on different subchannels or being time division multiplexed on different symbol periods of a slot. In some cases, the scheduling device 305 may schedule the different transmitting UEs 115 to transmit on the respective AGC training resources.

At 330, the UE 115-*e* may determine an AGC configuration based on receiving the training sidelink transmission. For example, the UE 115-*e* may perform AGC training based on the training sidelink transmission received on the AGC training resource from the UE 115-*d*. The UE 115-*e* may use the AGC configuration to receive other signaling from the UE 115-*d* during the duration of time, as the UE 115-*d* may be configured to transmit using a same transmit power as used to transmit the training sidelink transmission. Therefore, the UE 115-*e* may be able to apply a same gain or same AGC configuration without having to perform AGC training again for the later signaling.

Resources may be associated with the AGC training resources. For example, a slot may be associated with an AGC training resource. The UE 115-*e* may use a gain from the associated training resource in order to receive sidelink signaling for the associated slot. In some cases, the association may be broadcast by the scheduler. For example, the scheduling device 305 may broadcast an indication of an association between resources for one or more sidelink transmissions and the resources configured for AGC training.

Additionally, or alternatively, the association may be transmitted as part of the scheduling information. For example, the UE 115-*d* may receive, from the scheduling device 305, a configuration scheduling the UE 115-*d* to transmit the one or more sidelink transmissions on one or more slots. The configuration may include one or more slot indices, one or more symbol indices, or one or more resource allocation indicators, or any combination thereof, indicating that sidelink resources for the one or more sidelink transmissions are associated with the resources configured for the AGC training.

At 335, the UE 115-*d* may transmit, to the UE 115-*e*, one or more sidelink transmissions using the transmit power over the duration of time based on receiving the transmit power indication. For example, the UE 115-*d* may transmit sidelink messages to the UE 115-*e* using the constant transmit power within the duration of time. Therefore, the UE 115-*e* may be able to reuse the AGC configuration or AGC settings determined based on the AGC training resource to receive the sidelink messages within the duration of time.

By reusing the AGC configuration or AGC settings, the sidelink messages which are transmitted within the duration of time may reuse a symbol period formerly used for AGC training. For example, in some other systems, a first symbol period of each slot for sidelink communications may be used for AGC training, but this symbol period may be used for other schemes if reusing the AGC configuration or AGC settings. In some cases, the UE 115-*d* may include parity information in the first symbol of a slot carrying a first sidelink transmission of the one or more sidelink transmissions. For example, the former AGC training symbol period may be reused to convey parity information. Additionally, or alternatively, the UE 115-*d* may rate match a sidelink shared channel resource (e.g., a PSSCH resource) for the sidelink transmissions to include the first symbol of the slot. In some cases, the UE 115-*d* may shift a slot structure of a slot carrying the sidelink transmissions such that a beginning symbol of the slot is a beginning information symbol of the sidelink transmissions.

Figure 4:
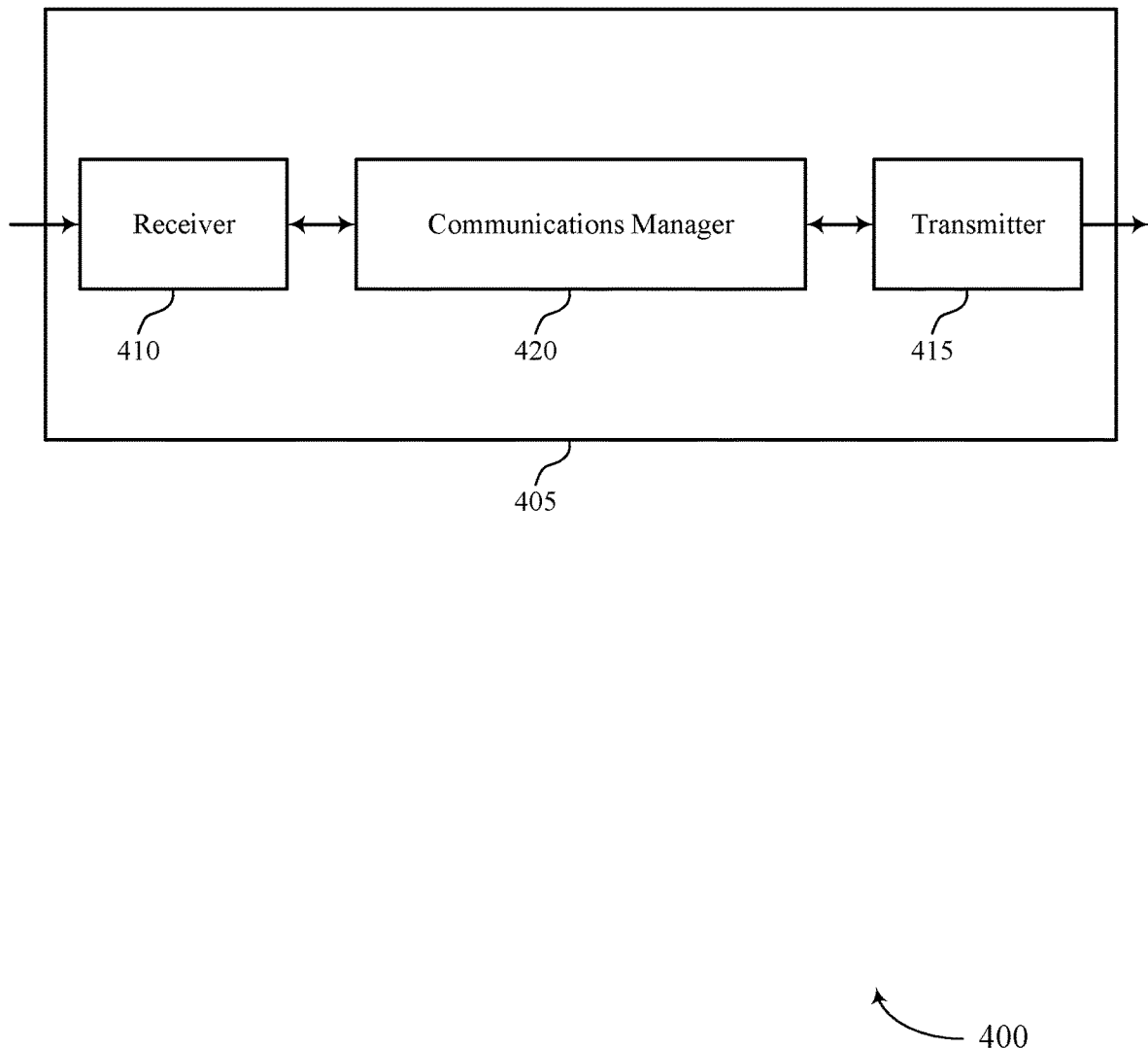
FIGS. 4 and 5 show block diagrams of devices that support techniques for AGC in sidelink systems in accordance with aspects of the present disclosure.

FIG. 4 shows a block diagram 400 of a device 405 that supports techniques for AGC in sidelink systems in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for AGC in sidelink systems). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for AGC in sidelink systems). In some examples, the transmitter 415 may be co-located with a receiver 410 in a transceiver. The transmitter 415 may utilize a single antenna or a set of multiple antennas.

The communications manager 420, the receiver 410, the transmitter 415, or various combinations thereof or various components thereof may be examples of means for performing various aspects of techniques for AGC in sidelink systems as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a first UE in accordance with examples as disclosed herein. For example, the communications manager 420 may be configured as or otherwise support a means for receiving, from a scheduling device, a transmit power indication configuring the first UE to use a same transmit power for sidelink signaling over a duration of time. The communications manager 420 may be configured as or otherwise support a means for transmitting, to a second UE and based on receiving the transmit power indication, a training sidelink transmission using a transmit power on a resource. The communications manager 420 may be configured as or otherwise support a means for transmitting, to the second UE, one or more sidelink transmissions using the transmit power over the duration of time based on receiving the transmit power indication.

Additionally or alternatively, the communications manager 420 may support wireless communications at a second UE in accordance with examples as disclosed herein. For example, the communications manager 420 may be configured as or otherwise support a means for receiving, from a scheduling device, a transmit power indication configuring one or more UEs to use a same transmit power for sidelink signaling over a duration of time. The communications manager 420 may be configured as or otherwise support a means for receiving, from a first UE of the one or more UEs, a training sidelink transmission transmitted at a transmit power on a resource. The communications manager 420 may be configured as or otherwise support a means for determining an AGC configuration based on receiving the training sidelink transmission. The communications manager 420 may be configured as or otherwise support a means for receiving, from the first UE, one or more sidelink transmissions over the duration of time based on the AGC configuration.

Additionally or alternatively, the communications manager 420 may support wireless communications at a scheduling device in accordance with examples as disclosed herein. For example, the communications manager 420 may be configured as or otherwise support a means for transmitting, to at least a first UE, an indication for the first UE to use a same transmit power for transmissions over a duration of time, where the same transmit power is a transmit power used by the first UE to transmit on a resource. The communications manager 420 may be configured as or otherwise support a means for transmitting a configuration to the first UE scheduling the first UE for one or more sidelink transmissions to a second UE using the transmit power on one or more slots.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for more efficient utilization of communication resources. For example, by reusing an AGC configuration determined from previously-received signaling, a symbol per slot, which was previously used for AGC training, may be used to convey information or improve decoding performance.

Figure 5:
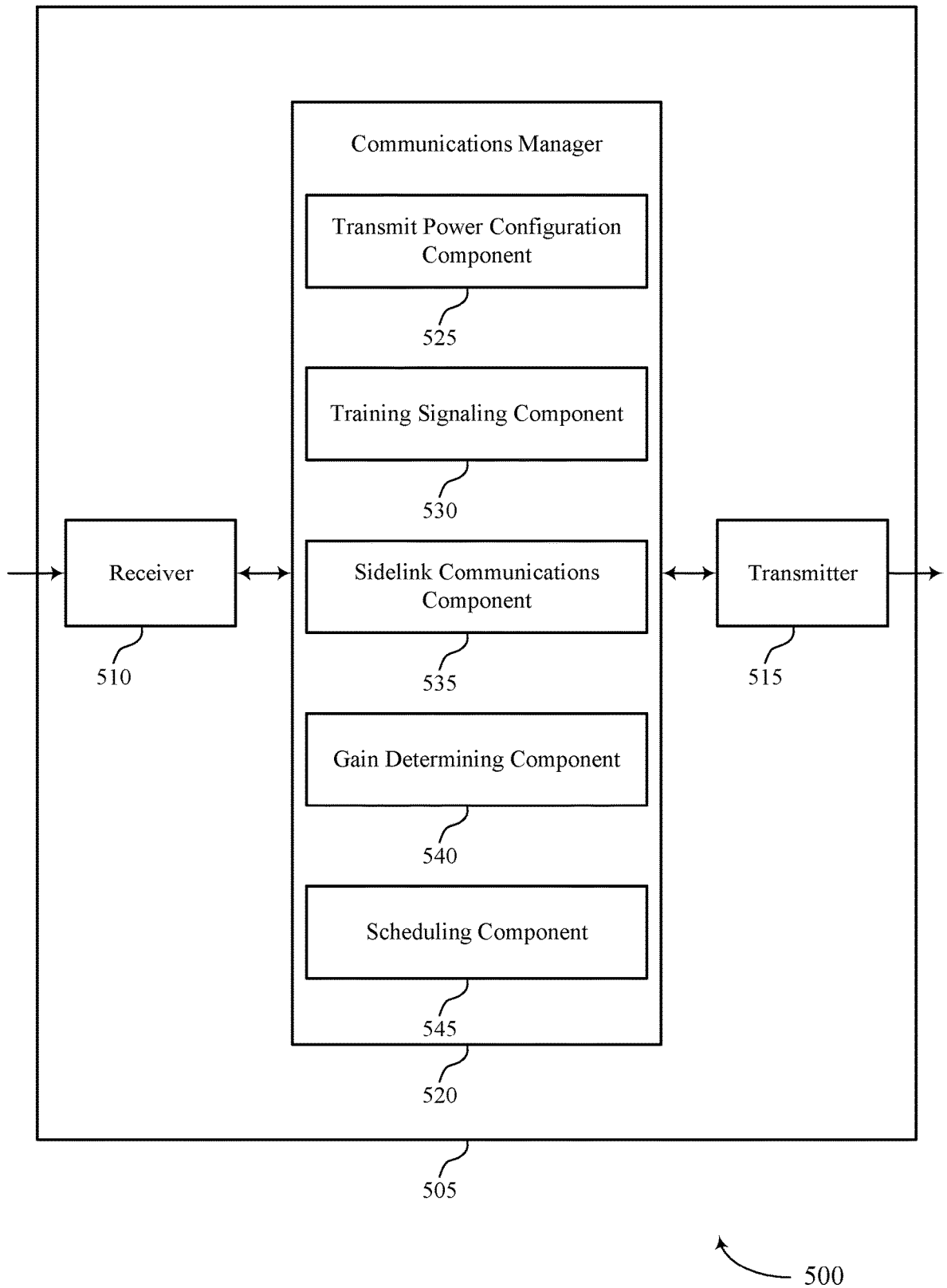

FIG. 5 shows a block diagram 500 of a device 505 that supports techniques for AGC in sidelink systems in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for AGC in sidelink systems). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for AGC in sidelink systems). In some examples, the transmitter 515 may be co-located with a receiver 510 in a transceiver. The transmitter 515 may utilize a single antenna or a set of multiple antennas.

The device 505, or various components thereof, may be an example of means for performing various aspects of techniques for AGC in sidelink systems as described herein. For example, the communications manager 520 may include a transmit power configuration component 525, a training signaling component 530, a sidelink communications component 535, a gain determining component 540, a scheduling component 545, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first UE in accordance with examples as disclosed herein. The transmit power configuration component 525 may be configured as or otherwise support a means for receiving, from a scheduling device, a transmit power indication configuring the first UE to use a same transmit power for sidelink signaling over a duration of time. The training signaling component 530 may be configured as or otherwise support a means for transmitting, to a second UE and based on receiving the transmit power indication, a training sidelink transmission using a transmit power on a resource. The sidelink communications component 535 may be configured as or otherwise support a means for transmitting, to the second UE, one or more sidelink transmissions using the transmit power over the duration of time based on receiving the transmit power indication.

Additionally or alternatively, the communications manager 520 may support wireless communications at a second UE in accordance with examples as disclosed herein. The transmit power configuration component 525 may be configured as or otherwise support a means for receiving, from a scheduling device, a transmit power indication configuring one or more UEs to use a same transmit power for sidelink signaling over a duration of time. The training signaling component 530 may be configured as or otherwise support a means for receiving, from a first UE of the one or more UEs, a training sidelink transmission transmitted at a transmit power on a resource. The gain determining component 540 may be configured as or otherwise support a means for determining an AGC configuration based on receiving the training sidelink transmission. The sidelink communications component 535 may be configured as or otherwise support a means for receiving, from the first UE, one or more sidelink transmissions over the duration of time based on the AGC configuration.

Additionally or alternatively, the communications manager 520 may support wireless communications at a scheduling device in accordance with examples as disclosed herein. The transmit power configuration component 525 may be configured as or otherwise support a means for transmitting, to at least a first UE, an indication for the first UE to use a same transmit power for transmissions over a duration of time, where the same transmit power is a transmit power used by the first UE to transmit on a resource. The scheduling component 545 may be configured as or otherwise support a means for transmitting a configuration to the first UE scheduling the first UE for one or more sidelink transmissions to a second UE using the transmit power on one or more slots.

Figure 6:
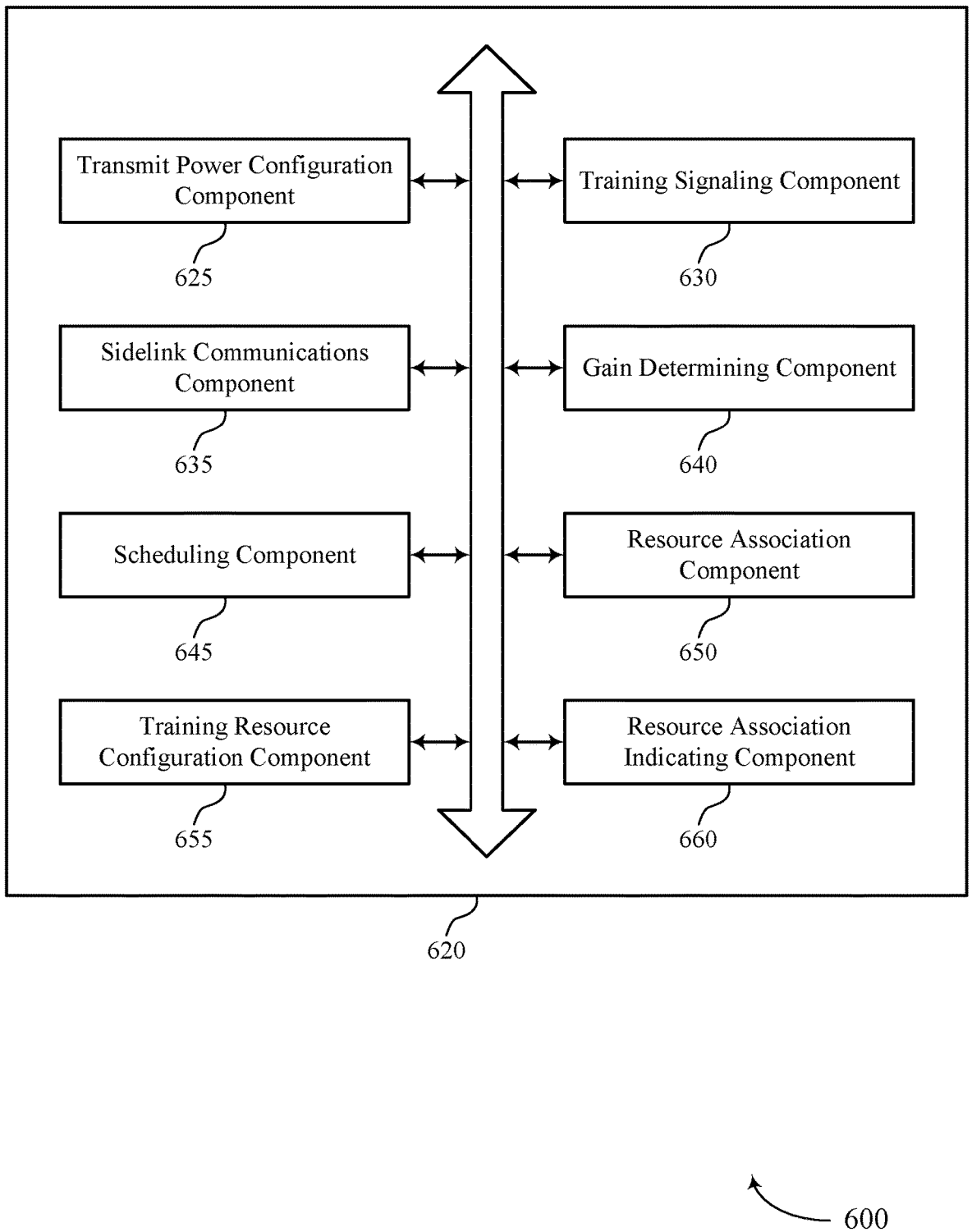
FIG. 6 shows a block diagram of a communications manager that supports techniques for AGC in sidelink systems in accordance with aspects of the present disclosure.

FIG. 6 shows a block diagram 600 of a communications manager 620 that supports techniques for AGC in sidelink systems in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for AGC in sidelink systems as described herein. For example, the communications manager 620 may include a transmit power configuration component 625, a training signaling component 630, a sidelink communications component 635, a gain determining component 640, a scheduling component 645, a resource association component 650, a training resource configuration component 655, a resource association indicating component 660, or any combination thereof. Each of these components may communicate, directly or indirectly, with one another (e.g., via one or more buses).

The communications manager 620 may support wireless communications at a first UE in accordance with examples as disclosed herein. The transmit power configuration component 625 may be configured as or otherwise support a means for receiving, from a scheduling device, a transmit power indication configuring the first UE to use a same transmit power for sidelink signaling over a duration of time. The training signaling component 630 may be configured as or otherwise support a means for transmitting, to a second UE and based on receiving the transmit power indication, a training sidelink transmission using a transmit power on a resource. The sidelink communications component 635 may be configured as or otherwise support a means for transmitting, to the second UE, one or more sidelink transmissions using the transmit power over the duration of time based on receiving the transmit power indication.

In some examples, the resource association component 650 may be configured as or otherwise support a means for receiving, from the scheduling device, a configuration scheduling the first UE to transmit the one or more sidelink transmissions on one or more slots, the configuration including one or more slot indices, one or more symbol indices, or one or more resource allocation indicators, or any combination thereof, indicating that sidelink resources for the one or more sidelink transmissions are associated with the resource configured for the AGC training.

In some examples, the resource association component 650 may be configured as or otherwise support a means for receiving, from the scheduling device, an indication of an association between resources for the one or more sidelink transmissions and the resource.

In some examples, the training resource configuration component 655 may be configured as or otherwise support a means for receiving an indication of the resource via RRC signaling, sidelink RRC signaling, PC5-RRC signaling, DCI, SCI, a MAC CE, or any combination thereof.

In some examples, to support transmitting the one or more sidelink transmissions, the sidelink communications component 635 may be configured as or otherwise support a means for rate matching a PSSCH resource for at least a first sidelink transmission of the one or more sidelink transmissions to include a beginning symbol of a slot.

In some examples, to support transmitting the one or more sidelink transmissions, the sidelink communications component 635 may be configured as or otherwise support a means for shifting a slot structure of a slot carrying a first sidelink transmission of the one or more sidelink transmissions, where a beginning symbol of the slot includes a beginning information symbol of the first sidelink transmission based on shifting the slot structure.

In some examples, to support transmitting the one or more sidelink transmissions, the sidelink communications component 635 may be configured as or otherwise support a means for including parity information in a first symbol of a slot carrying a first sidelink transmission of the one or more sidelink transmissions.

In some examples, the transmit power indication includes an indication of the transmit power.

In some examples, the transmit power indication configures the first UE to maintain the transmit power for the duration of time.

In some examples, the duration of time is based on a number of slots or a number of transmissions, or both.

Additionally or alternatively, the communications manager 620 may support wireless communications at a second UE in accordance with examples as disclosed herein. In some examples, the transmit power configuration component 625 may be configured as or otherwise support a means for receiving, from a scheduling device, a transmit power indication configuring one or more UEs to use a same transmit power for sidelink signaling over a duration of time. In some examples, the training signaling component 630 may be configured as or otherwise support a means for receiving, from a first UE of the one or more UEs, a training sidelink transmission transmitted at a transmit power on a resource. The gain determining component 640 may be configured as or otherwise support a means for determining an AGC configuration based on receiving the training sidelink transmission. In some examples, the sidelink communications component 635 may be configured as or otherwise support a means for receiving, from the first UE, one or more sidelink transmissions over the duration of time based on the AGC configuration.

In some examples, to support receiving the one or more sidelink transmissions, the gain determining component 640 may be configured as or otherwise support a means for applying a gain determined based on the training sidelink transmission to receive the one or more sidelink transmissions.

In some examples, the resource association component 650 may be configured as or otherwise support a means for receiving, from the scheduling device, a configuration including one or more slot indices, one or more symbol indices, or one or more resource allocation indicators, or any combination thereof, mapping sidelink resources for the one or more sidelink transmissions to the resource configured for the AGC training.

In some examples, to support receiving the training sidelink transmission, the resource association component 650 may be configured as or otherwise support a means for receiving, from each of a set of multiple UEs, a respective training sidelink transmission transmitted at a respective transmit power on a respective resource configured for the AGC training. In some examples, to support receiving the training sidelink transmission, the gain determining component 640 may be configured as or otherwise support a means for determining, for each of the set of multiple UEs, a respective AGC configuration. In some examples, to support receiving the training sidelink transmission, the sidelink communications component 635 may be configured as or otherwise support a means for receiving, from each of the set of multiple UEs, respective one or more sidelink transmissions over the duration of time based on the respective AGC configuration.

In some examples, the respective resources configured for the AGC training are frequency division multiplexed or time division multiplexed, or both.

In some examples, the training resource configuration component 655 may be configured as or otherwise support a means for receiving an indication of the resource via RRC signaling, sidelink RRC signaling, PC5-RRC signaling, DCI, SCI, a MAC-CE, or any combination thereof.

In some examples, to support receiving the one or more sidelink transmissions, the sidelink communications component 635 may be configured as or otherwise support a means for receiving a first sidelink transmission of the one or more sidelink transmissions during a slot based on a PSSCH for the first sidelink transmission being rate matched to include a beginning symbol of the slot.

In some examples, to support receiving the one or more sidelink transmissions, the sidelink communications component 635 may be configured as or otherwise support a means for receiving a first sidelink transmission of the one or more sidelink transmissions during a slot based on a slot structure of the slot being shifted such that a beginning symbol of the slot includes a beginning information symbol of the first sidelink transmission.

In some examples, to support receiving the one or more sidelink transmissions, the sidelink communications component 635 may be configured as or otherwise support a means for decoding a first sidelink transmission of the one or more sidelink transmissions based on parity information included in a first symbol of a slot carrying the first sidelink transmission.

In some examples, the duration of time is based on a number of slots or a number of transmissions, or both.

Additionally or alternatively, the communications manager 620 may support wireless communications at a scheduling device in accordance with examples as disclosed herein. In some examples, the transmit power configuration component 625 may be configured as or otherwise support a means for transmitting, to at least a first UE, an indication for the first UE to use a same transmit power for transmissions over a duration of time, where the same transmit power is a transmit power used by the first UE to transmit on a resource. The scheduling component 645 may be configured as or otherwise support a means for transmitting a configuration to the first UE scheduling the first UE for one or more sidelink transmissions to a second UE using the transmit power on one or more slots.

In some examples, to support transmitting the configuration, the resource association indicating component 660 may be configured as or otherwise support a means for transmitting the configuration including one or more slot indices, one or more symbol indices, or one or more resource allocation indicators, or any combination thereof, indicating that sidelink resources for the one or more sidelink transmissions are associated with the resource configured for the AGC training.

In some examples, the resource association indicating component 660 may be configured as or otherwise support a means for broadcasting an indication of an association between resources for the one or more sidelink transmissions and the resource.

In some examples, the training resource configuration component 655 may be configured as or otherwise support a means for transmitting, to the first UE or the second UE, or both, an indication of the resource via RRC signaling, sidelink RRC signaling, PC5-RRC signaling, DCI, SCI, a MAC-CE, or any combination thereof.

In some examples, the indication includes a value for the transmit power used to transmit on the resource. In some examples, the transmit power indication configures the first UE to maintain the transmit power for the duration of time. In some examples, the duration of time is based on a number of slots or a number of transmissions, or both.

Figure 7:
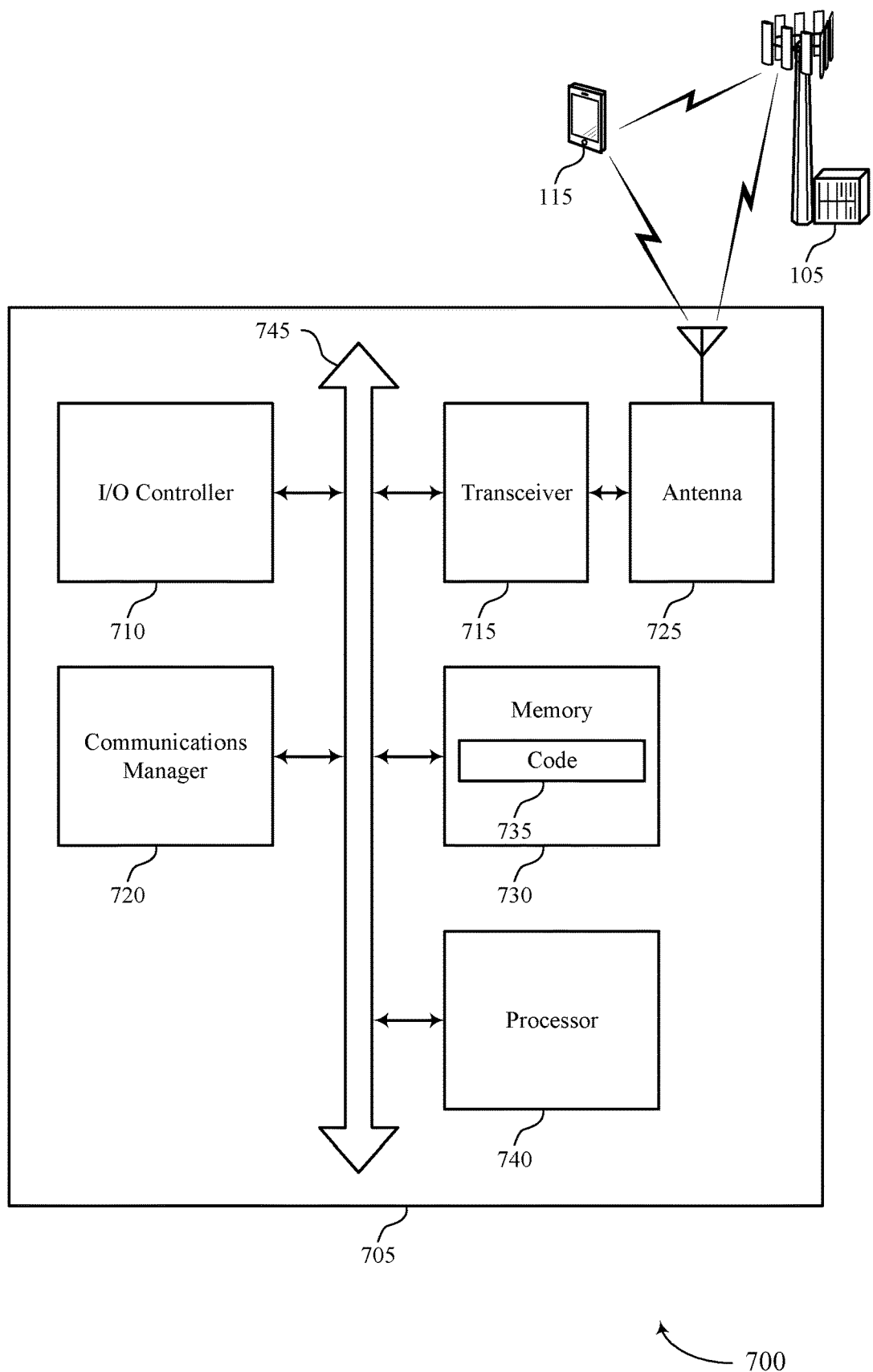
FIG. 7 shows a diagram of a system including a device that supports techniques for AGC in sidelink systems in accordance with aspects of the present disclosure.

FIG. 7 shows a diagram of a system 700 including a device 705 that supports techniques for AGC in sidelink systems in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for AGC in sidelink systems). For example, the device 705 or a component of the device 705 may include a processor 740 and memory 730 coupled to the processor 740, the processor 740 and memory 730 configured to perform various functions described herein.

The communications manager 720 may support wireless communications at a first UE in accordance with examples as disclosed herein. For example, the communications manager 720 may be configured as or otherwise support a means for receiving, from a scheduling device, a transmit power indication configuring the first UE to use a same transmit power for sidelink signaling over a duration of time. The communications manager 720 may be configured as or otherwise support a means for transmitting, to a second UE and based on receiving the transmit power indication, a training sidelink transmission using a transmit power on a resource. The communications manager 720 may be configured as or otherwise support a means for transmitting, to the second UE, one or more sidelink transmissions using the transmit power over the duration of time based on receiving the transmit power indication.

Additionally or alternatively, the communications manager 720 may support wireless communications at a second UE in accordance with examples as disclosed herein. For example, the communications manager 720 may be configured as or otherwise support a means for receiving, from a scheduling device, a transmit power indication configuring one or more UEs to use a same transmit power for sidelink signaling over a duration of time. The communications manager 720 may be configured as or otherwise support a means for receiving, from a first UE of the one or more UEs, a training sidelink transmission transmitted at a transmit power on a resource. The communications manager 720 may be configured as or otherwise support a means for determining an AGC configuration based on receiving the training sidelink transmission. The communications manager 720 may be configured as or otherwise support a means for receiving, from the first UE, one or more sidelink transmissions over the duration of time based on the AGC configuration.

Additionally or alternatively, the communications manager 720 may support wireless communications at a scheduling device in accordance with examples as disclosed herein. For example, the communications manager 720 may be configured as or otherwise support a means for transmitting, to at least a first UE, an indication for the first UE to use a same transmit power for transmissions over a duration of time, where the same transmit power is a transmit power used by the first UE to transmit on a resource. The communications manager 720 may be configured as or otherwise support a means for transmitting a configuration to the first UE scheduling the first UE for one or more sidelink transmissions to a second UE using the transmit power on one or more slots.

By including or configuring the communications manager 720 in accordance with examples as described herein, the device 705 may support techniques for more efficient utilization of communication resources. For example, by reusing an AGC configuration determined from previously-received signaling, a symbol per slot, which was previously used for AGC training, may be used to convey information or improve decoding performance.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for AGC in sidelink systems as described herein, or the processor 740 and the memory 730 may be otherwise configured to perform or support such operations.

Figure 8:
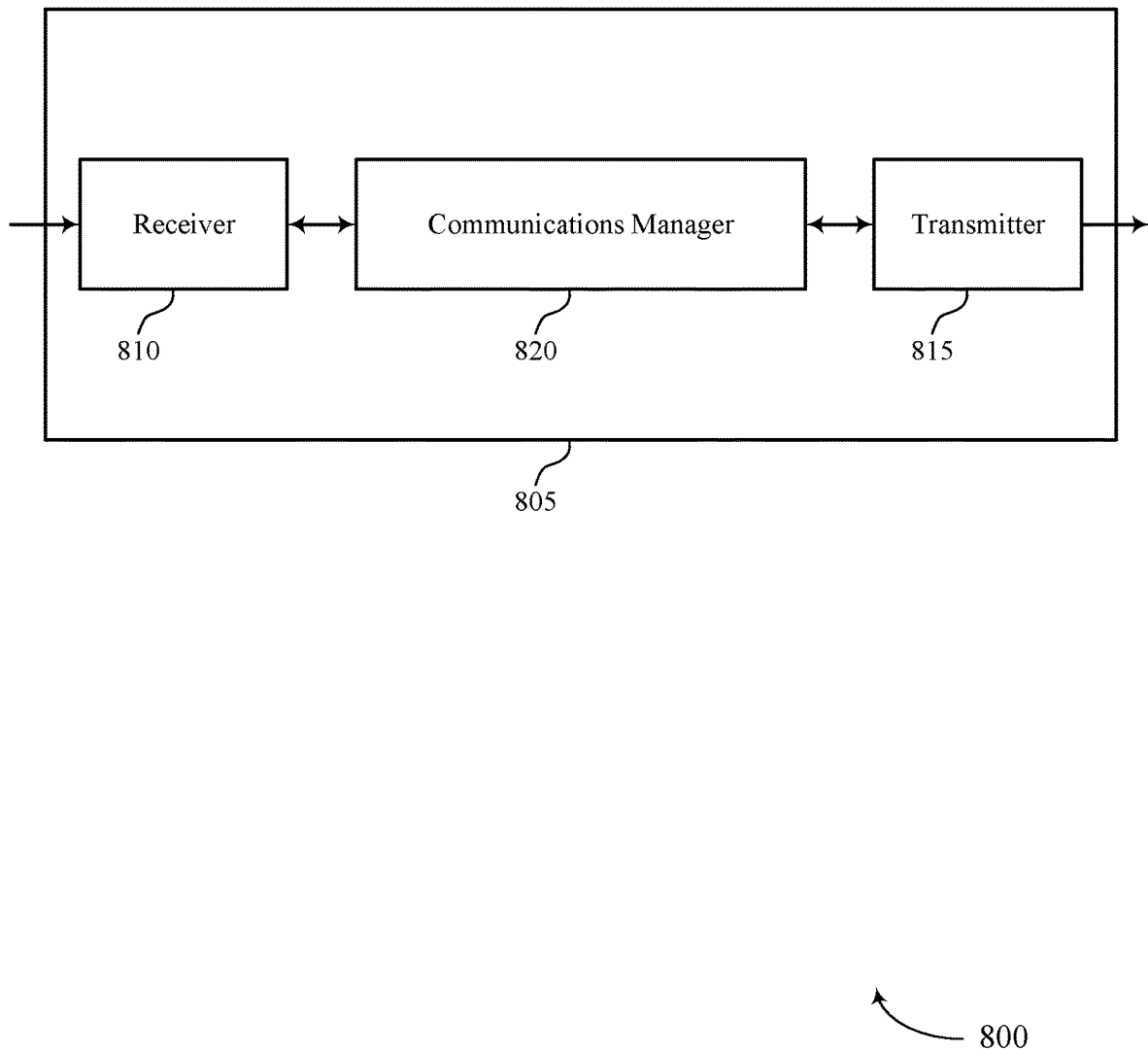
FIGS. 8 and 9 show block diagrams of devices that support techniques for AGC in sidelink systems in accordance with aspects of the present disclosure.

FIG. 8 shows a block diagram 800 of a device 805 that supports techniques for AGC in sidelink systems in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for AGC in sidelink systems). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for AGC in sidelink systems). In some examples, the transmitter 815 may be co-located with a receiver 810 in a transceiver. The transmitter 815 may utilize a single antenna or a set of multiple antennas.

The communications manager 820, the receiver 810, the transmitter 815, or various combinations thereof or various components thereof may be examples of means for performing various aspects of techniques for AGC in sidelink systems as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a scheduling device in accordance with examples as disclosed herein. For example, the communications manager 820 may be configured as or otherwise support a means for transmitting, to at least a first UE, an indication for the first UE to use a same transmit power for transmissions over a duration of time, where the same transmit power is a transmit power used by the first UE to transmit on a resource. The communications manager 820 may be configured as or otherwise support a means for transmitting a configuration to the first UE scheduling the first UE for one or more sidelink transmissions to a second UE using the transmit power on one or more slots.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for more efficient utilization of communication resources. For example, by reusing an AGC configuration determined from previously-received signaling, a symbol per slot, which was previously used for AGC training, may be used to convey information or improve decoding performance.

Figure 9:
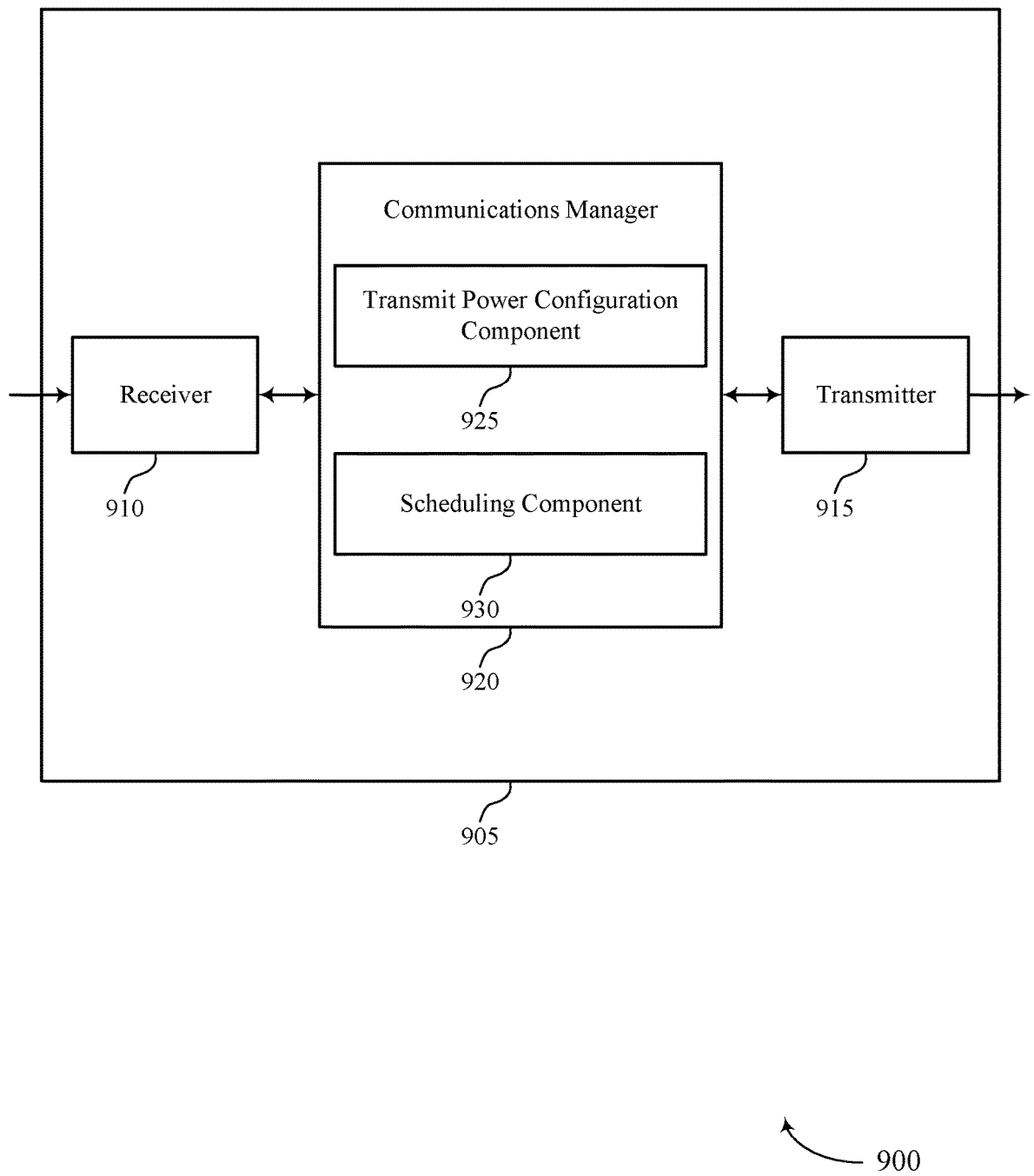

FIG. 9 shows a block diagram 900 of a device 905 that supports techniques for AGC in sidelink systems in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for AGC in sidelink systems). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for AGC in sidelink systems). In some examples, the transmitter 915 may be co-located with a receiver 910 in a transceiver. The transmitter 915 may utilize a single antenna or a set of multiple antennas.

The device 905, or various components thereof, may be an example of means for performing various aspects of techniques for AGC in sidelink systems as described herein. For example, the communications manager 920 may include a transmit power configuration component 925 a scheduling component 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a scheduling device in accordance with examples as disclosed herein. The transmit power configuration component 925 may be configured as or otherwise support a means for transmitting, to at least a first UE, an indication for the first UE to use a same transmit power for transmissions over a duration of time, where the same transmit power is a transmit power used by the first UE to transmit on a resource. The scheduling component 930 may be configured as or otherwise support a means for transmitting a configuration to the first UE scheduling the first UE for one or more sidelink transmissions to a second UE using the transmit power on one or more slots.

Figure 10:
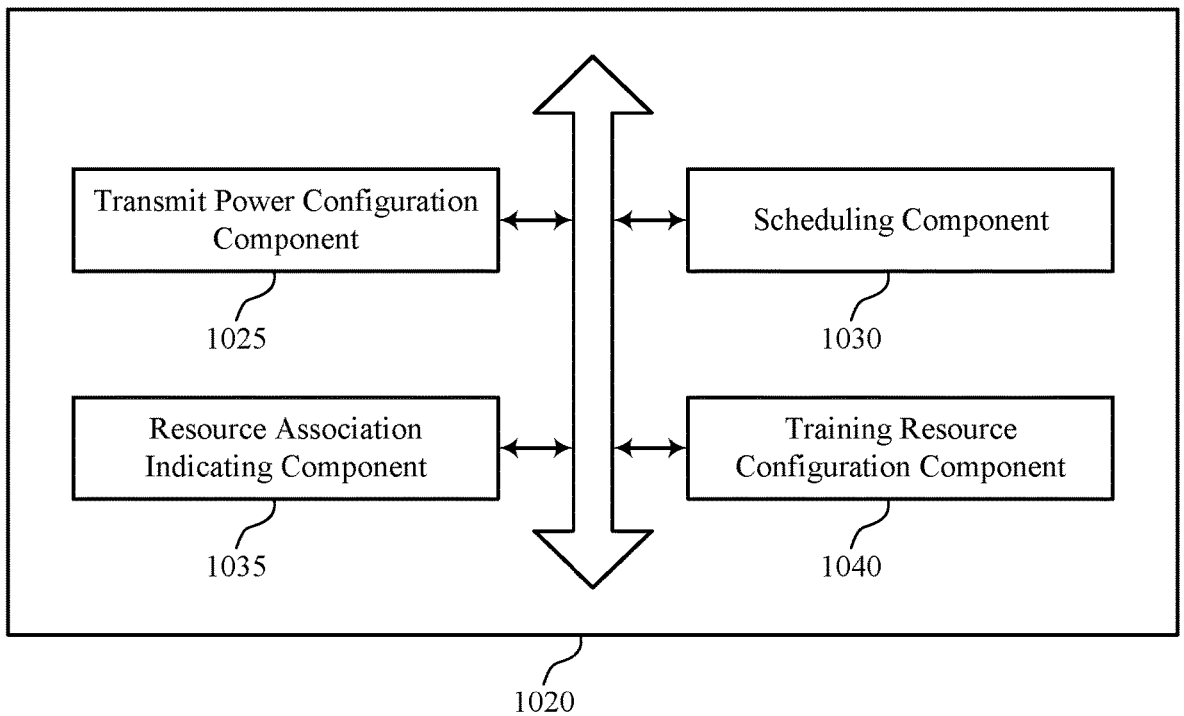
FIG. 10 shows a block diagram of a communications manager that supports techniques for AGC in sidelink systems in accordance with aspects of the present disclosure.

FIG. 10 shows a block diagram 1000 of a communications manager 1020 that supports techniques for AGC in sidelink systems in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for AGC in sidelink systems as described herein. For example, the communications manager 1020 may include a transmit power configuration component 1025, a scheduling component 1030, a resource association indicating component 1035, a training resource configuration component 1040, or any combination thereof. Each of these components may communicate, directly or indirectly, with one another (e.g., via one or more buses).

The communications manager 1020 may support wireless communications at a scheduling device in accordance with examples as disclosed herein. The transmit power configuration component 1025 may be configured as or otherwise support a means for transmitting, to at least a first UE, an indication for the first UE to use a same transmit power for transmissions over a duration of time, where the same transmit power is a transmit power used by the first UE to transmit on a resource. The scheduling component 1030 may be configured as or otherwise support a means for transmitting a configuration to the first UE scheduling the first UE for one or more sidelink transmissions to a second UE using the transmit power on one or more slots.

In some examples, to support transmitting the configuration, the resource association indicating component 1035 may be configured as or otherwise support a means for transmitting the configuration including one or more slot indices, one or more symbol indices, or one or more resource allocation indicators, or any combination thereof, indicating that sidelink resources for the one or more sidelink transmissions are associated with the resource configured for the AGC training.

In some examples, the resource association indicating component 1035 may be configured as or otherwise support a means for broadcasting an indication of an association between resources for the one or more sidelink transmissions and the resource.

In some examples, the training resource configuration component 1040 may be configured as or otherwise support a means for transmitting, to the first UE or the second UE, or both, an indication of the resource via RRC signaling, sidelink RRC signaling, PC5-RRC signaling, DCI, SCI, a MAC-CE, or any combination thereof.

In some examples, the indication includes a value for the transmit power used to transmit on the resource. In some examples, the transmit power indication configures the first UE to maintain the transmit power for the duration of time. In some examples, the duration of time is based on a number of slots or a number of transmissions, or both.

Figure 11:
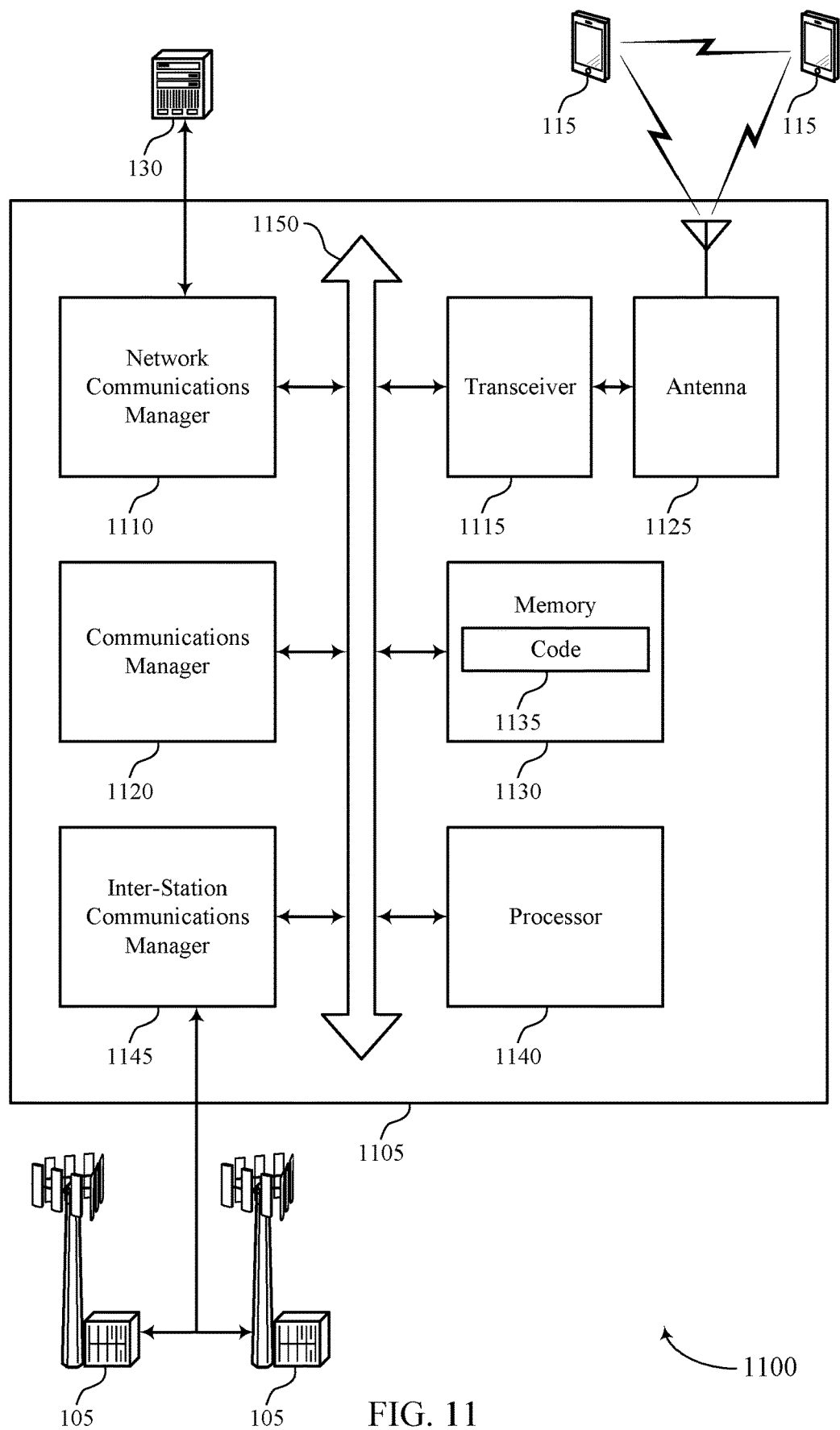
FIG. 11 shows a diagram of a system including a device that supports techniques for AGC in sidelink systems in accordance with aspects of the present disclosure.

FIG. 11 shows a diagram of a system 1100 including a device 1105 that supports techniques for AGC in sidelink systems in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for AGC in sidelink systems). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a scheduling device in accordance with examples as disclosed herein. For example, the communications manager 1120 may be configured as or otherwise support a means for transmitting, to at least a first UE, an indication for the first UE to use a same transmit power for transmissions over a duration of time, where the same transmit power is a transmit power used by the first UE to transmit on a resource. The communications manager 1120 may be configured as or otherwise support a means for transmitting a configuration to the first UE scheduling the first UE for one or more sidelink transmissions to a second UE using the transmit power on one or more slots.

By including or configuring the communications manager 1120 in accordance with examples as described herein, the device 1105 may support techniques for more efficient utilization of communication resources. For example, by reusing an AGC configuration determined from previously-received signaling, a symbol per slot, which was previously used for AGC training, may be used to convey information or improve decoding performance.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for AGC in sidelink systems as described herein, or the processor 1140 and the memory 1130 may be otherwise configured to perform or support such operations.

Figure 12:
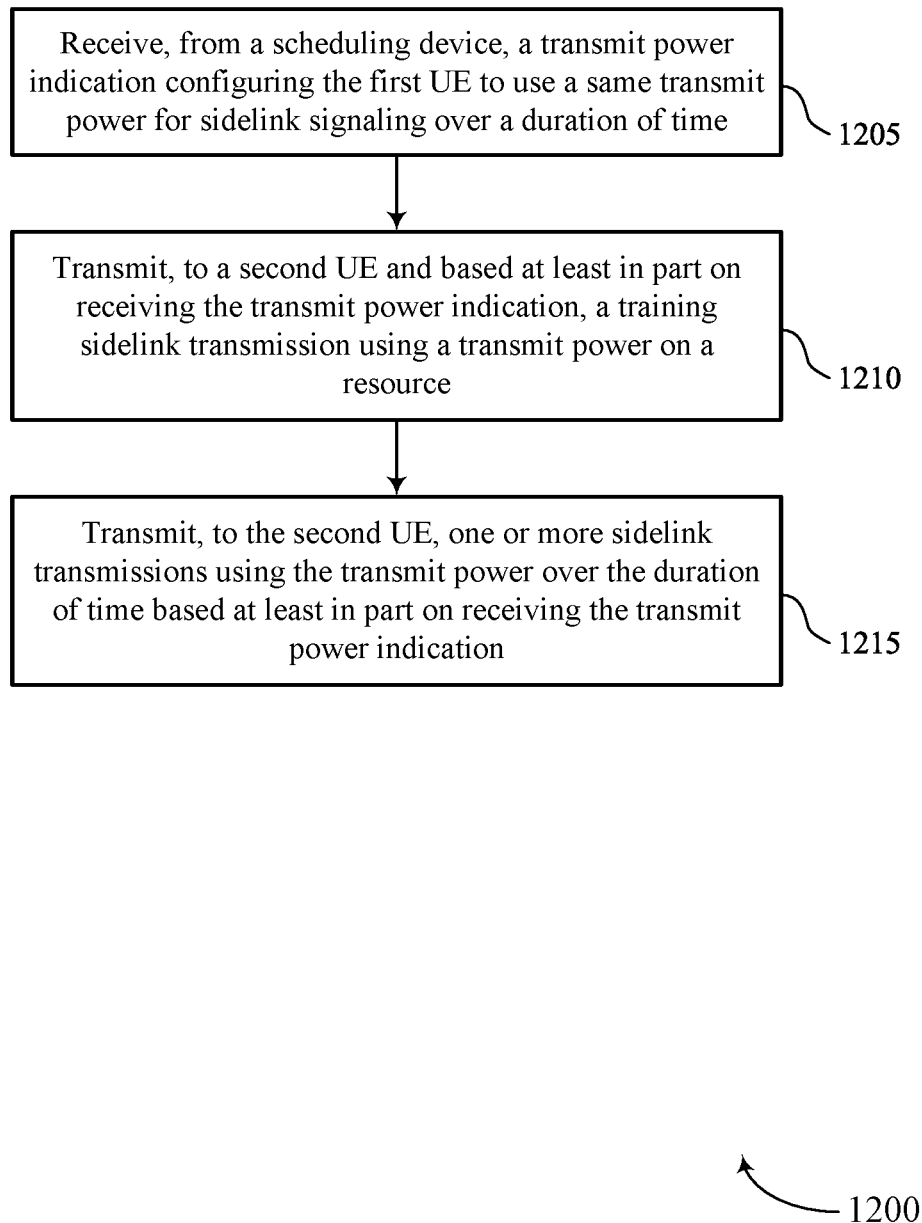
FIGS. 12 through 16 show flowcharts illustrating methods that support techniques for AGC in sidelink systems in accordance with aspects of the present disclosure.

FIG. 12 shows a flowchart illustrating a method 1200 that supports techniques for AGC in sidelink systems in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving, from a scheduling device, a transmit power indication configuring the first UE to use a same transmit power for sidelink signaling over a duration of time. The operations of 1205 may be performed in accordance with examples as disclosed herein. In some examples, aspects of the operations of 1205 may be performed by a transmit power configuration component 625 as described with reference to FIG. 6.

At 1210, the method may include transmitting, to a second UE and based on receiving the transmit power indication, a training sidelink transmission using a transmit power on a resource. The operations of 1210 may be performed in accordance with examples as disclosed herein. In some examples, aspects of the operations of 1210 may be performed by a training signaling component 630 as described with reference to FIG. 6.

At 1215, the method may include transmitting, to the second UE, one or more sidelink transmissions using the transmit power over the duration of time based on receiving the transmit power indication. The operations of 1215 may be performed in accordance with examples as disclosed herein. In some examples, aspects of the operations of 1215 may be performed by a sidelink communications component 635 as described with reference to FIG. 6.

Figure 13:
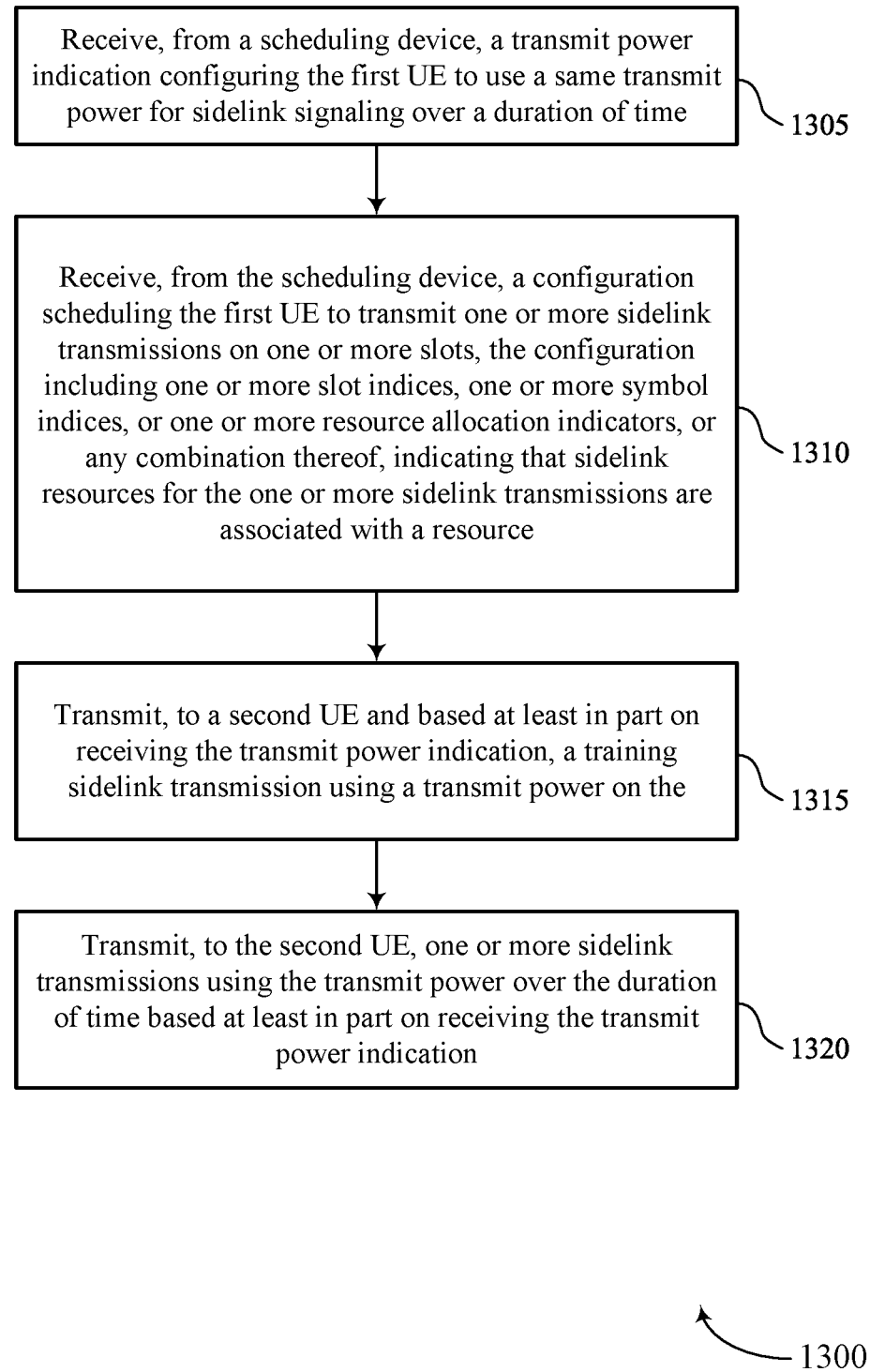

FIG. 13 shows a flowchart illustrating a method 1300 that supports techniques for AGC in sidelink systems in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from a scheduling device, a transmit power indication configuring the first UE to use a same transmit power for sidelink signaling over a duration of time. The operations of 1305 may be performed in accordance with examples as disclosed herein. In some examples, aspects of the operations of 1305 may be performed by a transmit power configuration component 625 as described with reference to FIG. 6.

At 1310, the method may include receiving, from the scheduling device, a configuration scheduling the first UE to transmit one or more sidelink transmissions on one or more slots, the configuration including one or more slot indices, one or more symbol indices, or one or more resource allocation indicators, or any combination thereof, indicating that sidelink resources for the one or more sidelink transmissions are associated with a resource. The operations of 1310 may be performed in accordance with examples as disclosed herein. In some examples, aspects of the operations of 1310 may be performed by a resource association component 650 as described with reference to FIG. 6.

At 1315, the method may include transmitting, to a second UE and based on receiving the transmit power indication, a training sidelink transmission using a transmit power on the resource. The operations of 1315 may be performed in accordance with examples as disclosed herein. In some examples, aspects of the operations of 1315 may be performed by a training signaling component 630 as described with reference to FIG. 6.

At 1320, the method may include transmitting, to the second UE, one or more sidelink transmissions using the transmit power over the duration of time based on receiving the transmit power indication. The operations of 1320 may be performed in accordance with examples as disclosed herein. In some examples, aspects of the operations of 1320 may be performed by a sidelink communications component 635 as described with reference to FIG. 6.

Figure 14:
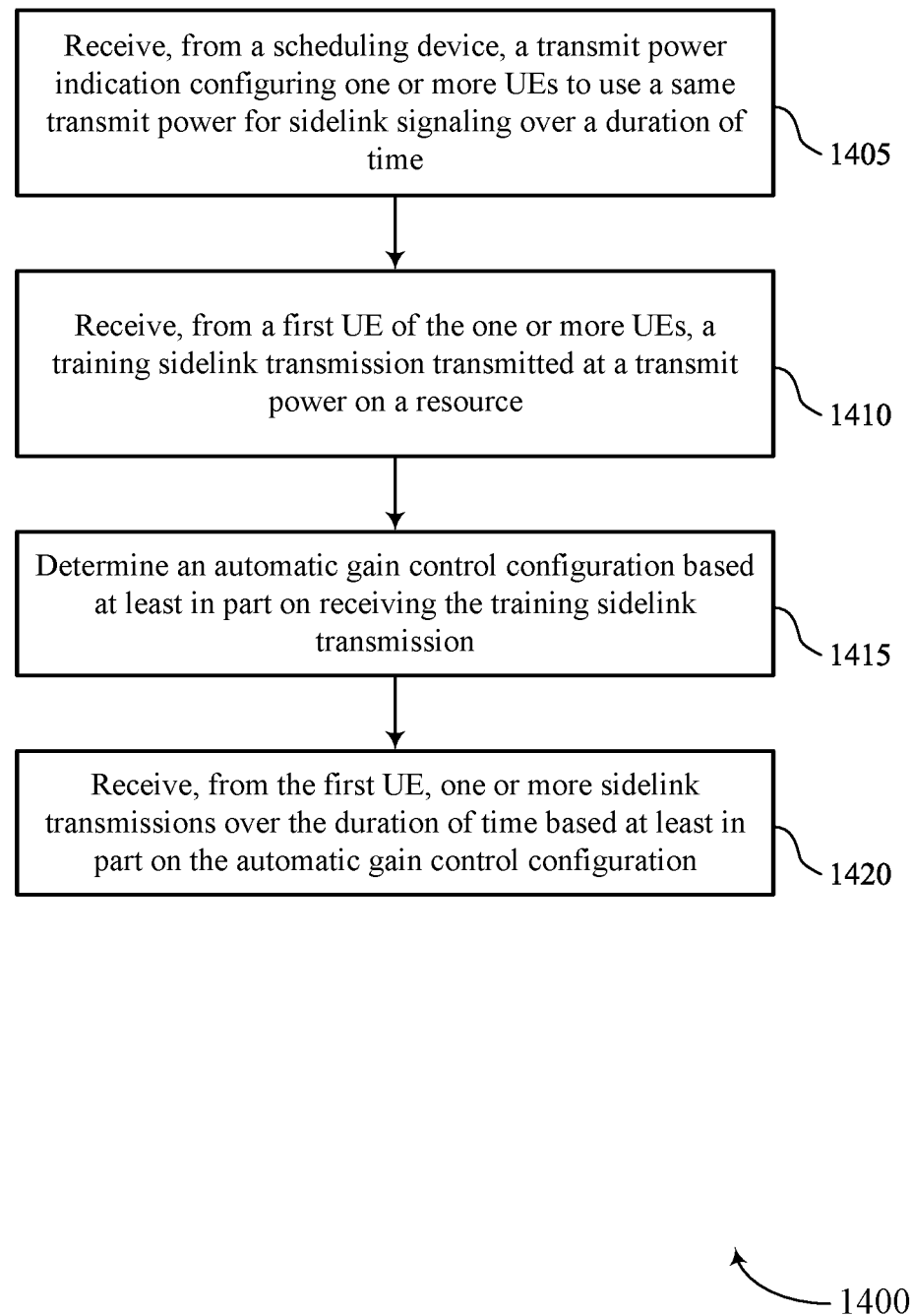

FIG. 14 shows a flowchart illustrating a method 1400 that supports techniques for AGC in sidelink systems in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving, from a scheduling device, a transmit power indication configuring one or more UEs to use a same transmit power for sidelink signaling over a duration of time. The operations of 1405 may be performed in accordance with examples as disclosed herein. In some examples, aspects of the operations of 1405 may be performed by a transmit power configuration component 625 as described with reference to FIG. 6.

At 1410, the method may include receiving, from a first UE of the one or more UEs, a training sidelink transmission transmitted at a transmit power on a resource. The operations of 1410 may be performed in accordance with examples as disclosed herein. In some examples, aspects of the operations of 1410 may be performed by a training signaling component 630 as described with reference to FIG. 6.

At 1415, the method may include determining an AGC configuration based on receiving the training sidelink transmission. The operations of 1415 may be performed in accordance with examples as disclosed herein. In some examples, aspects of the operations of 1415 may be performed by a gain determining component 640 as described with reference to FIG. 6.

At 1420, the method may include receiving, from the first UE, one or more sidelink transmissions over the duration of time based on the AGC configuration. The operations of 1420 may be performed in accordance with examples as disclosed herein. In some examples, aspects of the operations of 1420 may be performed by a sidelink communications component 635 as described with reference to FIG. 6.

Figure 15:
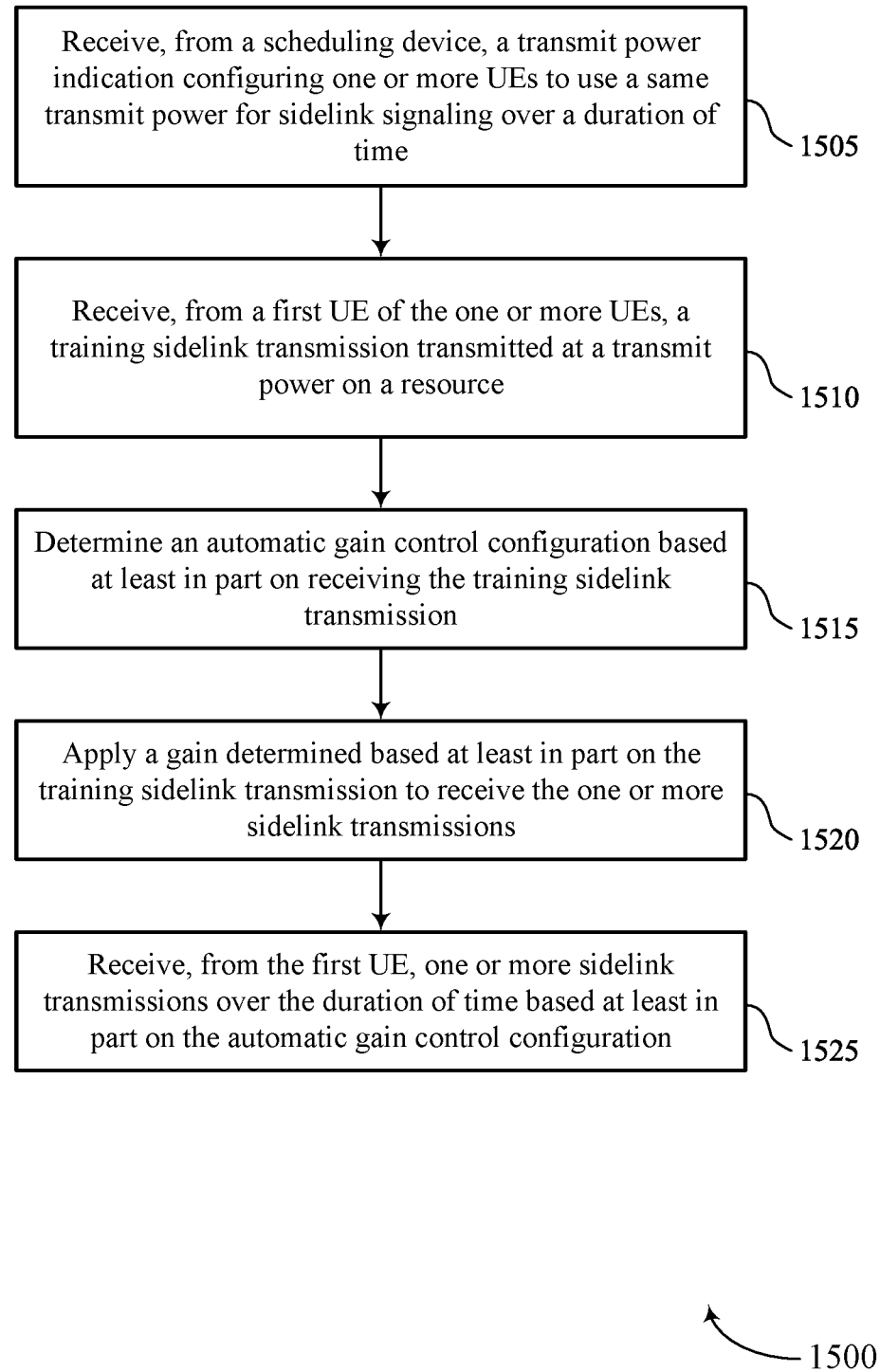

FIG. 15 shows a flowchart illustrating a method 1500 that supports techniques for AGC in sidelink systems in accordance with aspects of the present disclosure. The operations of the method 1500 may be implemented by a UE or its components as described herein. For example, the operations of the method 1500 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1505, the method may include receiving, from a scheduling device, a transmit power indication configuring one or more UEs to use a same transmit power for sidelink signaling over a duration of time. The operations of 1505 may be performed in accordance with examples as disclosed herein. In some examples, aspects of the operations of 1505 may be performed by a transmit power configuration component 625 as described with reference to FIG. 6.

At 1510, the method may include receiving, from a first UE of the one or more UEs, a training sidelink transmission transmitted at a transmit power on a resource. The operations of 1510 may be performed in accordance with examples as disclosed herein. In some examples, aspects of the operations of 1510 may be performed by a training signaling component 630 as described with reference to FIG. 6.

At 1515, the method may include determining an AGC configuration based on receiving the training sidelink transmission. The operations of 1515 may be performed in accordance with examples as disclosed herein. In some examples, aspects of the operations of 1515 may be performed by a gain determining component 640 as described with reference to FIG. 6.

At 1520, the method may include applying a gain determined based on the training sidelink transmission to receive the one or more sidelink transmissions. The operations of 1520 may be performed in accordance with examples as disclosed herein. In some examples, aspects of the operations of 1520 may be performed by a gain determining component 640 as described with reference to FIG. 6.

At 1525, the method may include receiving, from the first UE, one or more sidelink transmissions over the duration of time based on the AGC configuration. The operations of 1525 may be performed in accordance with examples as disclosed herein. In some examples, aspects of the operations of 1525 may be performed by a sidelink communications component 635 as described with reference to FIG. 6.

Figure 16:
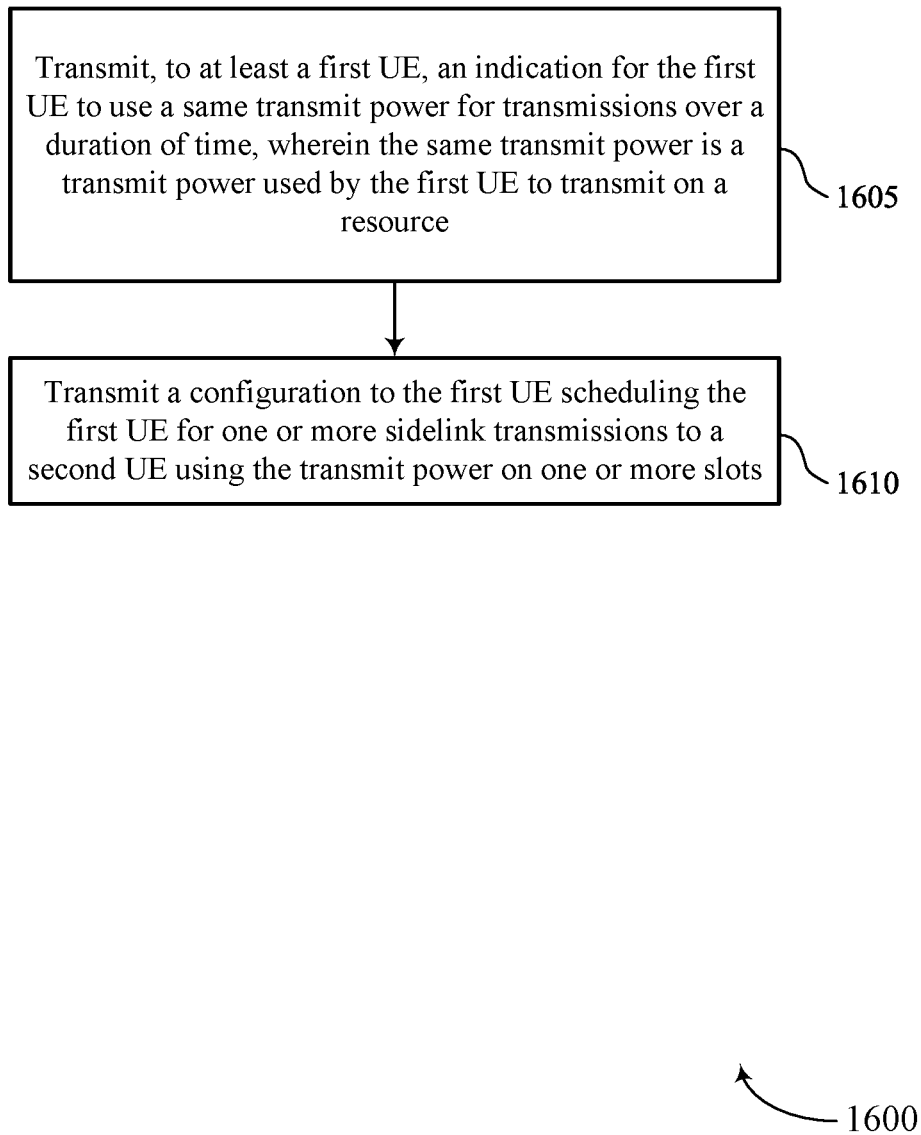

FIG. 16 shows a flowchart illustrating a method 1600 that supports techniques for AGC in sidelink systems in accordance with aspects of the present disclosure. The operations of the method 1600 may be implemented by a UE or a base station or its components as described herein. For example, the operations of the method 1600 may be performed by a UE 115 as described with reference to FIGS. 1 through 7 or a base station 105 as described with reference to FIGS. 1 through 3 and 8 through 11. In some examples, a UE or a base station may execute a set of instructions to control the functional elements of the UE or the base station to perform the described functions. Additionally or alternatively, the UE or the base station may perform aspects of the described functions using special-purpose hardware.

At 1605, the method may include transmitting, to at least a first UE, an indication for the first UE to use a same transmit power for transmissions over a duration of time, where the same transmit power is a transmit power used by the first UE to transmit on a resource. The operations of 1605 may be performed in accordance with examples as disclosed herein. In some examples, aspects of the operations of 1605 may be performed by a transmit power configuration component 625 or a transmit power configuration component 1025 as described with reference to FIGS. 6 and 10.

At 1610, the method may include transmitting a configuration to the first UE scheduling the first UE for one or more sidelink transmissions to a second UE using the transmit power on one or more slots. The operations of 1610 may be performed in accordance with examples as disclosed herein. In some examples, aspects of the operations of 1610 may be performed by a scheduling component 645 or a scheduling component 1030 as described with reference to FIGS. 6 and 10.

The following provides an overview of aspects of the present disclosure:

Aspect 1: A method for wireless communications at a first UE, comprising: receiving, from a scheduling device, a transmit power indication configuring the first UE to use a same transmit power for sidelink signaling over a duration of time; transmitting, to a second UE and based at least in part on receiving the transmit power indication, a training sidelink transmission using a transmit power on a resource; and transmitting, to the second UE, one or more sidelink transmissions using the transmit power over the duration of time based at least in part on receiving the transmit power indication.

Aspect 2: The method of aspect 1, further comprising: receiving, from the scheduling device, a configuration scheduling the first UE to transmit the one or more sidelink transmissions on one or more slots, the configuration including one or more slot indices, one or more symbol indices, or one or more resource allocation indicators, or any combination thereof, indicating that sidelink resources for the one or more sidelink transmissions are associated with the resource configured for the AGC training.

Aspect 3: The method of any of aspects 1 through 2, further comprising: receiving, from the scheduling device, an indication of an association between resources for the one or more sidelink transmissions and the resource.

Aspect 4: The method of any of aspects 1 through 3, further comprising: receiving an indication of the resource via RRC signaling, sidelink RRC signaling, PC5 RRC signaling, DCI, SCI, a MAC CE, or any combination thereof.

Aspect 5: The method of any of aspects 1 through 4, wherein transmitting the one or more sidelink transmissions comprises: rate matching a PSSCH resource for at least a first sidelink transmission of the one or more sidelink transmissions to include a beginning symbol of a slot.

Aspect 6: The method of any of aspects 1 through 5, wherein transmitting the one or more sidelink transmissions comprises: shifting a slot structure of a slot carrying a first sidelink transmission of the one or more sidelink transmissions, wherein a beginning symbol of the slot comprises a beginning information symbol of the first sidelink transmission based at least in part on shifting the slot structure.

Aspect 7: The method of any of aspects 1 through 6, wherein transmitting the one or more sidelink transmissions comprises: including parity information in a first symbol of a slot carrying a first sidelink transmission of the one or more sidelink transmissions.

Aspect 8: The method of any of aspects 1 through 7, wherein the transmit power indication includes an indication of the transmit power.

Aspect 9: The method of any of aspects 1 through 8, wherein the transmit power indication configures the first UE to maintain the transmit power for the duration of time.

Aspect 10: The method of any of aspects 1 through 9, wherein the duration of time is based at least in part on a number of slots or a number of transmissions, or both.

Aspect 11: The method of any of aspects 1 through 10, wherein the resource is configured for AGC training.

Aspect 12: A method for wireless communications at a second UE, comprising: receiving, from a scheduling device, a transmit power indication configuring one or more UEs to use a same transmit power for sidelink signaling over a duration of time; receiving, from a first UE of the one or more UEs, a training sidelink transmission transmitted at a transmit power on a resource; determining an AGC configuration based at least in part on receiving the training sidelink transmission; and receiving, from the first UE, one or more sidelink transmissions over the duration of time based at least in part on the AGC configuration.

Aspect 13: The method of aspect 12, wherein receiving the one or more sidelink transmissions comprises: applying a gain determined based at least in part on the training sidelink transmission to receive the one or more sidelink transmissions.

Aspect 14: The method of any of aspects 12 through 13, further comprising: receiving, from the scheduling device, a configuration including one or more slot indices, one or more symbol indices, or one or more resource allocation indicators, or any combination thereof, mapping sidelink resources for the one or more sidelink transmissions to the resource configured for the AGC training.

Aspect 15: The method of any of aspects 12 through 14, wherein receiving the training sidelink transmission comprises: receiving, from each of a plurality of UEs, a respective training sidelink transmission transmitted at a respective transmit power on a respective resource configured for the AGC training; determining, for each of the plurality of UEs, a respective AGC configuration; and receiving, from each of the plurality of UEs, respective one or more sidelink transmissions over the duration of time based at least in part on the respective AGC configuration.

Aspect 16: The method of aspect 15, wherein the respective resources configured for the AGC training are frequency division multiplexed or time division multiplexed, or both.

Aspect 17: The method of any of aspects 12 through 16, further comprising: receiving an indication of the resource via RRC signaling, sidelink RRC signaling, PC5 RRC signaling, DCI, SCI, a MAC CE, or any combination thereof.

Aspect 18: The method of any of aspects 12 through 17, wherein receiving the one or more sidelink transmissions comprises: receiving a first sidelink transmission of the one or more sidelink transmissions during a slot based at least in part on a PSSCH resource for the first sidelink transmission being rate matched to include a beginning symbol of the slot.

Aspect 19: The method of any of aspects 12 through 18, wherein receiving the one or more sidelink transmissions comprises: receiving a first sidelink transmission of the one or more sidelink transmissions during a slot based at least in part on a slot structure of the slot being shifted such that a beginning symbol of the slot comprises a beginning information symbol of the first sidelink transmission.

Aspect 20: The method of any of aspects 12 through 19, wherein receiving the one or more sidelink transmissions comprises: decoding a first sidelink transmission of the one or more sidelink transmissions based at least in part on parity information included in a first symbol of a slot carrying the first sidelink transmission.

Aspect 21: The method of any of aspects 12 through 20, wherein the duration of time is based at least in part on a number of slots or a number of transmissions, or both.

Aspect 22: A method for wireless communications at a scheduling device, comprising: transmitting, to at least a first UE, an indication for the first UE to use a same transmit power for transmissions over a duration of time, wherein the same transmit power is a transmit power used by the first UE to transmit on a resource; and transmitting a configuration to the first UE scheduling the first UE for one or more sidelink transmissions to a second UE using the transmit power on one or more slots.

Aspect 23: The method of aspect 22, wherein transmitting the configuration comprises: transmitting the configuration including one or more slot indices, one or more symbol indices, or one or more resource allocation indicators, or any combination thereof, indicating that sidelink resources for the one or more sidelink transmissions are associated with the resource.

Aspect 24: The method of any of aspects 22 through 23, further comprising: broadcasting an indication of an association between resources for the one or more sidelink transmissions and the resource.

Aspect 25: The method of any of aspects 22 through 24, further comprising: transmitting, to the first UE or the second UE, or both, an indication of the resource via RRC signaling, sidelink RRC signaling, PC5 RRC signaling, DCI, SCI, a MAC CE, or any combination thereof.

Aspect 26: The method of any of aspects 22 through 25, wherein the indication includes a value for the transmit power used to transmit on the resource.

Aspect 27: The method of any of aspects 22 through 26, wherein the transmit power indication configures the first UE to maintain the transmit power for the duration of time.

Aspect 28: The method of any of aspects 22 through 27, wherein the duration of time is based at least in part on a number of slots or a number of transmissions, or both.

Aspect 29: An apparatus for wireless communications at a first UE, comprising a processor; memory coupled with the processor; and instructions stored in the memory and executable by the processor to cause the apparatus to perform a method of any of aspects 1 through 10.

Aspect 30: An apparatus for wireless communications at a first UE, comprising at least one means for performing a method of any of aspects 1 through 10.

Aspect 31: A non-transitory computer-readable medium storing code for wireless communications at a first UE, the code comprising instructions executable by a processor to perform a method of any of aspects 1 through 10.

Aspect 32: An apparatus for wireless communications at a second UE, comprising a processor; memory coupled with the processor; and instructions stored in the memory and executable by the processor to cause the apparatus to perform a method of any of aspects 12 through 21.

Aspect 33: An apparatus for wireless communications at a second UE, comprising at least one means for performing a method of any of aspects 12 through 21.

Aspect 34: A non-transitory computer-readable medium storing code for wireless communications at a second UE, the code comprising instructions executable by a processor to perform a method of any of aspects 12 through 21.

Aspect 35: An apparatus for wireless communications at a scheduling device, comprising a processor; memory coupled with the processor; and instructions stored in the memory and executable by the processor to cause the apparatus to perform a method of any of aspects 22 through 28.

Aspect 36: An apparatus for wireless communications at a scheduling device, comprising at least one means for performing a method of any of aspects 22 through 28.

Aspect 37: A non-transitory computer-readable medium storing code for wireless communications at a scheduling device, the code comprising instructions executable by a processor to perform a method of any of aspects 22 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:
a processing system that includes processor circuitry and memory circuitry that stores code, the processing system configured to cause the first UE to:
receive, from a scheduling device, a control message indicating a duration of time, wherein the control message configures the first UE to use a same transmit power for instances of sidelink signaling that occur during the duration of time;
transmit, to a second UE and based at least in part on the control message, a training sidelink transmission using a transmit power on a resource; and
transmit, to the second UE, one or more sidelink transmissions using the transmit power via resources within the duration of time based at least in part on the control message that configures the first UE to use the same transmit power for the sidelink signaling that occurs during the duration of time.

2. The apparatus of claim 1, wherein the processing system is further configured to cause the first UE to:
receive, from the scheduling device, a configuration scheduling the first UE to transmit the one or more sidelink transmissions on one or more slots, the configuration including one or more slot indices, one or more symbol indices, or one or more resource allocation indicators, or any combination thereof, indicating that sidelink resources for the one or more sidelink transmissions are associated with the resource.

3. The apparatus of claim 1, wherein the processing system is further configured to cause the first UE to:
receive, from the scheduling device, an indication of an association between resources for the one or more sidelink transmissions and the resource configured for automatic gain control training.

4. The apparatus of claim 1, wherein the processing system is further configured to cause the first UE to:
receive an indication of the resource via Radio Resource Control (RRC) signaling, sidelink RRC signaling, PC5 RRC signaling, downlink control information, sidelink control information, a Medium Access Control (MAC) control element (CE), or any combination thereof.

5. The apparatus of claim 1, wherein, to transmit the one or more sidelink transmissions, the processing system is further configured to cause the first UE to:
rate match a physical sidelink shared channel resource for at least a first sidelink transmission of the one or more sidelink transmissions to include a beginning symbol of a slot.

6. The apparatus of claim 1, wherein, to transmit the one or more sidelink transmissions, the processing system is further configured to cause the first UE to:
shift a slot structure of a slot carrying a first sidelink transmission of the one or more sidelink transmissions, wherein a beginning symbol of the slot comprises a beginning information symbol of the first sidelink transmission based at least in part on shifting the slot structure.

7. The apparatus of claim 1, wherein, to transmit the one or more sidelink transmissions, the processing system is further configured to cause the first UE to:
include parity information in a first symbol of a slot carrying a first sidelink transmission of the one or more sidelink transmissions.

8. The apparatus of claim 1, wherein the control message includes an indication of the transmit power.

9. The apparatus of claim 1, wherein the control message configures the first UE to maintain the transmit power for the duration of time.

10. The apparatus of claim 1, wherein the duration of time is based at least in part on a number of slots or a number of transmissions, or both.

11. The apparatus of claim 1, wherein the resource is configured for automatic gain control training.

12. An apparatus for wireless communication at a second user equipment (UE), comprising:
a processing system that includes processor circuitry and memory circuitry that stores code, the processing system configured to cause the second UE to:
receive, from a scheduling device, a control message indicating a duration of time, wherein the control message configures one or more UEs to each use a same transmit power for sidelink signaling that occurs during the duration of time;
receive, from a first UE of the one or more UEs, a training sidelink transmission transmitted at a transmit power on a resource;
determine an automatic gain control configuration based at least in part on receiving the training sidelink transmission; and
receive, from the first UE, one or more sidelink transmissions via resources within the duration of time based at least in part on the automatic gain control configuration and the control message that configures the one or more UEs to use the same transmit power for the sidelink signaling that occurs during the duration of time.

13. The apparatus of claim 12, wherein, to receive the one or more sidelink transmissions, the processing system is further configured to cause the second UE to:
apply a gain determined based at least in part on the training sidelink transmission to receive the one or more sidelink transmissions.

14. The apparatus of claim 12, wherein the processing system is further configured to cause the second UE to:
receive, from the scheduling device, a configuration including one or more slot indices, one or more symbol indices, or one or more resource allocation indicators, or any combination thereof, mapping sidelink resources for the one or more sidelink transmissions to the resource.

15. The apparatus of claim 12, wherein, to receive the training sidelink transmission, the processing system is further configured to cause the second UE to:
receive, from each of a plurality of UEs, a respective training sidelink transmission transmitted at a respective transmit power on a respective resource configured for automatic gain control training;
determine, for each of the plurality of UEs, a respective automatic gain control configuration; and
receive, from each of the plurality of UEs, respective one or more sidelink transmissions over the duration of time based at least in part on the respective automatic gain control configuration.

16. The apparatus of claim 15, wherein the respective resources configured for the automatic gain control training are frequency division multiplexed or time division multiplexed, or both.

17. The apparatus of claim 12, wherein the processing system is further configured to cause the second UE to:
receive an indication of the resource configured for automatic gain control training via Radio Resource Control (RRC) signaling, sidelink RRC signaling, PC5 RRC signaling, downlink control information, sidelink control information, a Medium Access Control (MAC) control element (CE), or any combination thereof.

18. The apparatus of claim 12, wherein, to receive the one or more sidelink transmissions, the processing system is further configured to cause the second UE to:
receive a first sidelink transmission of the one or more sidelink transmissions during a slot based at least in part on a physical sidelink shared channel resource for the first sidelink transmission being rate matched to include a beginning symbol of the slot.

19. The apparatus of claim 12, wherein, to receive the one or more sidelink transmissions, the processing system is further configured to cause the second UE to:
receive a first sidelink transmission of the one or more sidelink transmissions during a slot based at least in part on a slot structure of the slot being shifted such that a beginning symbol of the slot comprises a beginning information symbol of the first sidelink transmission.

20. The apparatus of claim 12, wherein, to receive the one or more sidelink transmissions, the processing system is further configured to cause the second UE to:
decod a first sidelink transmission of the one or more sidelink transmissions based at least in part on parity information included in a first symbol of a slot carrying the first sidelink transmission.

21. The apparatus of claim 12, wherein the duration of time is based at least in part on a number of slots or a number of transmissions, or both.

22. An apparatus for wireless communication at a scheduling device, comprising:
a processing system that includes processor circuitry and memory circuitry that stores code, the processing system configured to cause the scheduling device to:
transmit, to at least a first user equipment (UE), a control message indicating a duration of time, wherein the control message configures the first UE to use a same transmit power for instances of sdelink signaling that occur during the duration of time, wherein the same transmit power is a transmit power used by the first UE to transmit on a resource; and
transmit a configuration to the first UE scheduling the first UE with resources for one or more sidelink transmissions to a second UE using the same transmit power, wherein the resources for the one or more sidelink transmissions are within the duration of time.

23. The apparatus of claim 22, wherein, to transmit the configuration, the processing system is further configured to cause the scheduling device to:
transmit the configuration including one or more slot indices, one or more symbol indices, or one or more resource allocation indicators, or any combination thereof, indicating that sidelink resources for the one or more sidelink transmissions are associated with the resource.

24. The apparatus of claim 22, wherein the processing system is further configured to cause the scheduling device to:
broadcast an indication of an association between resources for the one or more sidelink transmissions and the resource, wherein the resource is configured for automatic gain control training.

25. The apparatus of claim 22, wherein the processing system is further configured to cause the scheduling device to:
transmit, to the first UE or the second UE, or both, an indication of the resource via Radio Resource Control (RRC) signaling, downlink control information, sidelink control information, a Medium Access Control (MAC) control element (CE), or any combination thereof.

26. The apparatus of claim 22, wherein the control message includes a value for the transmit power used to transmit on the resource.

27. The apparatus of claim 22, wherein the control message configures the first UE to maintain the same transmit power for the duration of time.

28. The apparatus of claim 22, wherein the duration of time is based at least in part on a number of slots or a number of transmissions, or both.

29. A method for wireless communications at a first user equipment (UE), comprising:
receive, from a scheduling device, a control message indicating a duration of time, wherein the control message configures the first UE to use a same transmit power for instances of sidelink signaling that occur during the duration of time;
transmit, to a second UE and based at least in part on the control message, a training sidelink transmission using a transmit power on a resource; and
transmit, to the second UE, one or more sidelink transmissions using the transmit power via resources within the duration of time based at least in part on the control message that configures the first UE to use the same transmit power for the sidelink signaling that occurs during the duration of time.

30. The method of claim 29, further comprising:
receive, from the scheduling device, a configuration scheduling the first UE to transmit the one or more sidelink transmissions on one or more slots, the configuration including one or more slot indices, one or more symbol indices, or one or more resource allocation indicators, or any combination thereof, indicating that sidelink resources for the one or more sidelink transmissions are associated with the resource.

* * * * *